United States Patent
Schwaderer et al.

(10) Patent No.: US 10,949,087 B2
(45) Date of Patent: Mar. 16, 2021

(54) METHOD FOR RAPID REFERENCE OBJECT STORAGE FORMAT FOR CHROMA SUBSAMPLED IMAGES

(71) Applicant: Samsung Electronics Co., Ltd., Suwon-si (KR)

(72) Inventors: David Schwaderer, Sparks, NV (US); Sompong Paul Olarig, Pleasanton, CA (US); Jason Martineau, Milpitas, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/056,515

(22) Filed: Aug. 6, 2018

(65) Prior Publication Data

US 2019/0354287 A1 Nov. 21, 2019

Related U.S. Application Data

(60) Provisional application No. 62/672,043, filed on May 15, 2018.

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
CPC ...... G06F 16/11; G06F 3/0604; G06F 3/0643; G06F 3/0655; G06F 3/0679
See application file for complete search history.

(56) References Cited

U.S. PATENT DOCUMENTS

| | | | |
|---|---|---|---|
| 8,874,835 B1 | 10/2014 | Davis et al. | |
| 9,025,868 B2 | 5/2015 | Gurbuz | |
| 9,826,231 B2 | 11/2017 | Gamei et al. | |
| 9,854,241 B2 | 12/2017 | Rosewarne et al. | |
| 9,883,187 B2 | 1/2018 | Tu et al. | |
| 2008/0199084 A1 | 8/2008 | Kasahara | |
| 2012/0191900 A1 | 7/2012 | Kunimatsu et al. | |
| 2012/0201476 A1* | 8/2012 | Carmel | H04N 19/176 382/239 |
| 2015/0146976 A1 | 5/2015 | Ma et al. | |

(Continued)

FOREIGN PATENT DOCUMENTS

| JP | 2006235960 A | 9/2006 |
|---|---|---|
| JP | 5723812 B2 | 5/2015 |

(Continued)

OTHER PUBLICATIONS

Wu, Chin-Hsien, et al., "An Efficient B-Tree Layer for Flash-Memory Storage Systems," ACM Transactions on Embedded Computing Systems 6(3), Jul. 2007, 20 pages.

*Primary Examiner* — Yong J Choe
(74) *Attorney, Agent, or Firm* — Renaissance IP Law Group LLP

(57) ABSTRACT

A Key-Value SSD (KV-SSD) is disclosed. The KV-SSD may include a data structure including a plurality of image values used by the application program. The data structure may include a plurality of first dimension containers to organize the data according to a first dimension. Each of the plurality of first dimension containers may include at least one value storing image data for the image object at a resolution and a Chroma Subsampling rate.

6 Claims, 22 Drawing Sheets

(56) References Cited

U.S. PATENT DOCUMENTS

| | | |
|---|---|---|
| 2015/0172616 A1 | 6/2015 | Ye et al. |
| 2016/0099810 A1 | 4/2016 | Li et al. |
| 2016/0182913 A1 | 6/2016 | Joshi et al. |
| 2017/0127090 A1 | 5/2017 | Rosewarne et al. |
| 2017/0188000 A1 | 6/2017 | Rosewarne et al. |
| 2019/0034734 A1 | 1/2019 | Yen et al. |
| 2019/0043201 A1 | 2/2019 | Strong et al. |
| 2019/0356940 A1* | 11/2019 | Mallett ................ G06F 3/1446 |

FOREIGN PATENT DOCUMENTS

| | | |
|---|---|---|
| WO | 2012020544 A1 | 2/2012 |
| WO | 2015005634 A1 | 1/2015 |

* cited by examiner

METHOD FOR RAPID REFERENCE OBJECT STORAGE FORMAT FOR CHROMA SUBSAMPLED IMAGES

RELATED APPLICATION DATA

This application claims the benefit of U.S. Provisional Patent Application Ser. No. 62/672,043, filed May 15, 2018, which is incorporated by reference herein for all purposes.

FIELD

The inventive concepts relate generally to storage devices, and more particularly to storing Chroma subsampled image files in Key-Value Solid State Drives (KV-SSDs).

BACKGROUND

Computing systems increasingly store images for a variety of applications. Such images consume significant storage. Since a variety of applications access images for different purposes, storage systems store the images in a variety of resolutions, complicating storage administration procedures and application development/processing.

Chroma Subsampling is a mechanism for encoding visual information that exploits human vision characteristics that favor image luma (brightness) information over color (Chroma) information. Specifically, to perform Chroma Subsampling, it is necessary to separate image luma (black and white image) information from Chroma (color) information, after which an image may be stored using only particular color or luma subsamples, to reduce image storage size.

Conventional systems leave file management up to each application that uses the image file. This approach may result in multiple copies of the same file, at the same resolution and same Chroma Subsampling rate, being stored on the storage devices (in different locations selected by different applications). Further, this process may result in generating many images that are related (in that they are derived from the same original image) but only differ in resolution or Chroma Subsampling method. This approach may also make it difficult for an application to locate a particular image file: the application might have to scan the entire file system to locate a file with the desired resolution/Chroma Subsampling rate, assuming the application takes the time to search for any potentially existing copy of the file at the desired resolution/Chroma Subsampling rate.

A need remains for a way to improve the management of image files including Chroma Subsampling information across applications.

DETAILED DESCRIPTION

Figure 1:
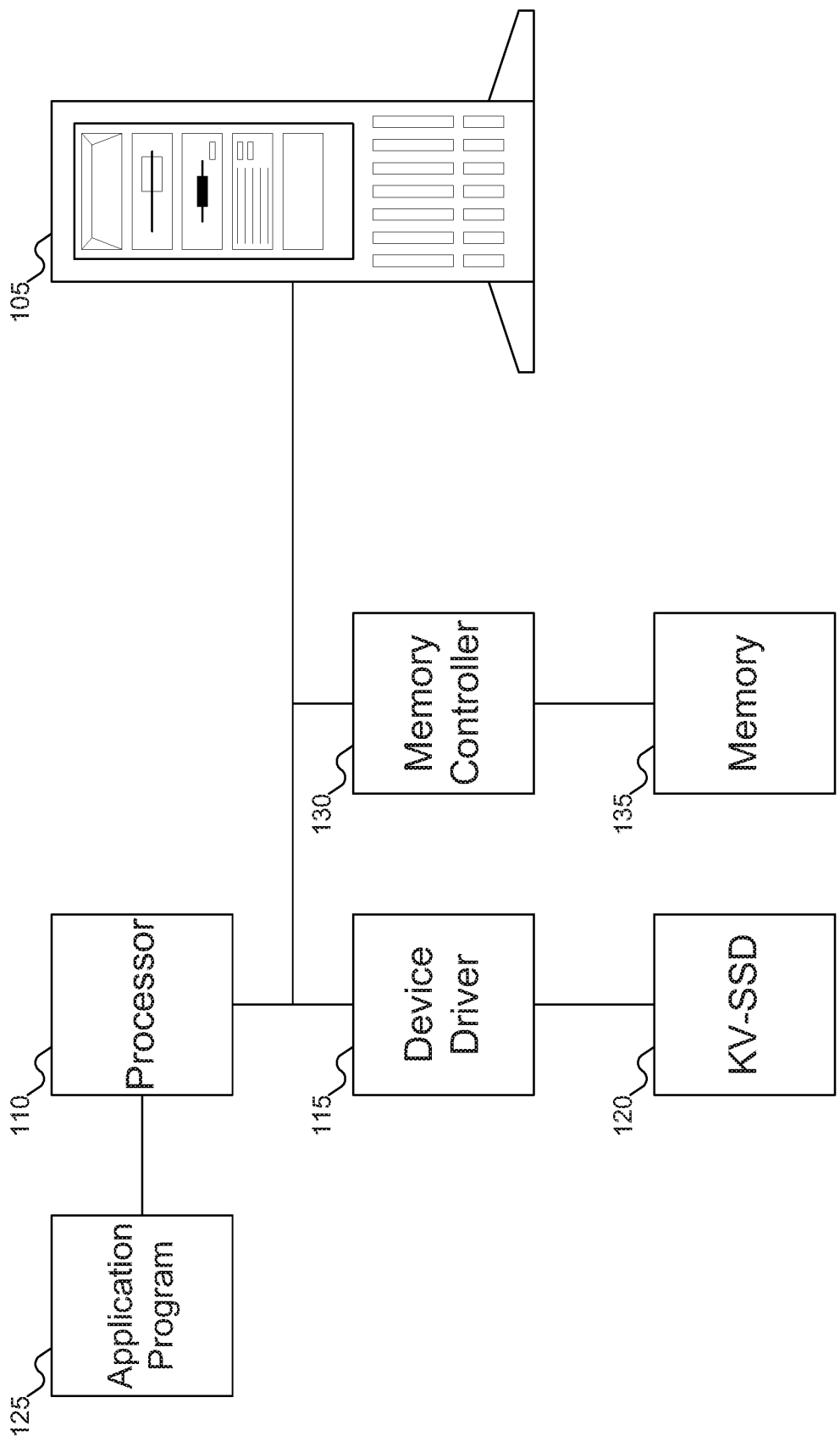
FIG. 1 shows a machine supporting centralized storage of Chroma subsampled image values in a Key-Value Solid State Drive (KV-SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Although the human brain needs no programming (other than experience) to process image data, storing and manipulating image data using computers may be a complex process. The more detail that is included in the image (such as the number of colors supported in the image format), the larger and more complex the image file may become.

Early image file formats stored images in relatively simple formats. For example, each pixel might be represented individually, storing values for the strength of the red, green, and blue signals in the pixel. But even using a relatively small number of bits per pixel for each color may result in a large image file. For example, an image that is 640×480 pixels contains a total of 307,200 pixels. If eight bits (one byte) are used to store the color information for each pixel, the image requires 307,200 bytes of storage. Increase the number of bits per pixel to 24 (eight bits for each value of red, green, and blue), and the image requires almost 1 MB of storage. Increase the number of bits per pixel for each color, or increase the size of the image, and the space requires increase further.

Other image file formats may improve on these storage requirements by "cheating" in various ways. For example, YUV encoding takes advantage of the fact that the human eye is much more sensitive to luminance (brightness) than to color, and may store less color information than everything that is in the original image. Thus, while the luma (Y) may be stored in full, the Chroma data (U and V) may be sampled in various ways so that when the image is seen by the human eye, the brain either does not notice the missing data or tolerates the absence of the missing data without difficulty.

There are several Chroma separation methods that produce similar results. Although embodiments of the inventive concept focus on the Chroma separation method known as YCbCr, other Chroma separation approaches are analogous and may be used as well.

To convert an RGB image's pixels into YUV image pixels, each pixel's Y component value represents the pixel's luma component and the Cb and Cr values represent the Chroma components. For example, if $E_R$, $E_B$, and $E_G$ are analog values between 0 and 1 representing how much red, green, and blue there is in a pixel, respectively, the following equations may be used to convert the RGB values to YCbCr values:

$$E_Y = 0.299 \cdot E_R + 0.587 \cdot E_G + 0.114 \cdot E_B$$

$$E_{Cb} = -0.169 \cdot E_R - 0.331 \cdot E_G + 0.500 \cdot E_B$$

$$E_{Cr} = 0.500 \cdot E_R - 0.419 \cdot E_G - 0.081 \cdot E_B$$

Collectively, the converted pixel values represent the image content in another format that enables subsequent Chroma Subsampling compression methods offering different compression results. Some common Chroma Subsampling methods include methods known as 4:0:0, 4:2:0, 4:2:2, etc. that algorithmically discard Chroma values at designated pixel positions. More generally, Subsampling strategies may be known as 4:N:M, where N and M typically have the same value and are drawn from the set {0, 2, 4}; however, embodiments of the inventive concept may support N and M having different values, and having values other than just 0, 2, or 4. Applications subsequently using the compressed image simply substitute the remaining Chroma values in their place. Meanwhile, the images enjoy Chroma Subsampling compression when stored on the storage device.

In practice, different applications have varying image resolution and Chromatic information requirements. Consequently, the same image may be stored as multiple YUV formatted images using a variety of Chroma Subsampling schemes and resolutions.

Conventional solutions did not organize the storage of these YUV formatted images. Applications were free to store the images anywhere they desired, without having to coordinate or share information with other applications. As a result, the same image, using the same Chroma Subsampling scheme and the same resolution, might be stored multiple times by different applications, or an application might not be able to locate a particular image using a particular Chroma Subsampling scheme and resolution, even though that image might be stored somewhere convenient. Further, this variety of application use may result in generating many images that are related (in that they are derived from the same original image) but only differ in resolution or Chroma Subsampling method. Aside from the difficulties in locating a particular image file and the possibility of redundant storage of the same image, applications might suffer from the delay associated with generating the image file they need, since they might not locate (or otherwise know about) the image file they need even though it is already stored on the storage device.

Storing all generated resolutions with associated Chroma Subsample information within a single image object simplifies storage, accelerates application development and subsequent application processing. One way to achieve this benefit is by using hierarchical tables or containers in a storage object to organize the various image values.

When an object contains a multiplicity of image resolutions and/or Chroma Subsampling schemes, applications that subsequently access the object enjoy a natural application processing acceleration when the application needs to resize the image. This benefit is because the various image values in an object may have reduced size images that contain less image data requiring resizing, re-sampling, or otherwise reprocessing. Thus, the application may select the most appropriate resized image within the object as application input. That is, an application generating a new image need not always use the user-designated base image, if a pre-existing image of closer resolution and/or Chroma Subsampling to the desired result may be found. The consequent reduced processing activity accelerates the application, and reduces response time as well as reduces infrastructure equipment capital, power, and cooling costs.

In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination. Processor 110 may run device driver 115, which may support access to storage device 120, shown as a Key-Value Solid State Drive (KV-SSD): different device drivers may support access to other components of machine 105. KV-SSD 120 uses a key-value interface to access data: an application or operating system may provide KV-SSD 120 with a key, which KV-SSD 120 may then map to a location on KV-SSD 120. KV-SSD 120 may then access and return the value stored at that location on KV-SSD 120. Unlike the complex command set offered by a conventional file system on conventional storage devices, KV-SSD 120 typically offers a fairly small set of commands, such as: GET (to retrieve the value associated with a provided key), PUT (to store the provided value on the KV-SSD, associated with either a provided key or with a KV-SSD generated key, which may be returned), and ERASE (to delete the value associated with the provided key from the KV-SSD, and remove the key-value association from the KV-SSD tables) (KV-SSD 120 may support other commands as well and may use different command names than those shown, but the principles are generally as described). KV-SSD 120 may also be replaced with any other storage device that supports object storage as described in the embodiments of the invention below. Processor 110 may also run application program 125, which may process image data that is stored using Chroma Subsampling techniques.

Machine 105 may also include memory controller 130, which may be used to manage access to main memory 135. Memory 135 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 135 may also be any desired combination of different memory types.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, while FIG. 1 shows machine 105 as including both KV-SSD 120 and application program 125, embodiments of the inventive concept could have these components in separate machines: for example, KV-SSD 120 might be installed on a server that is connected to machine 105 (and application program 125) via a network connection traversing one or more networks of any types (wired, wireless, global, etc.).

Figure 2:
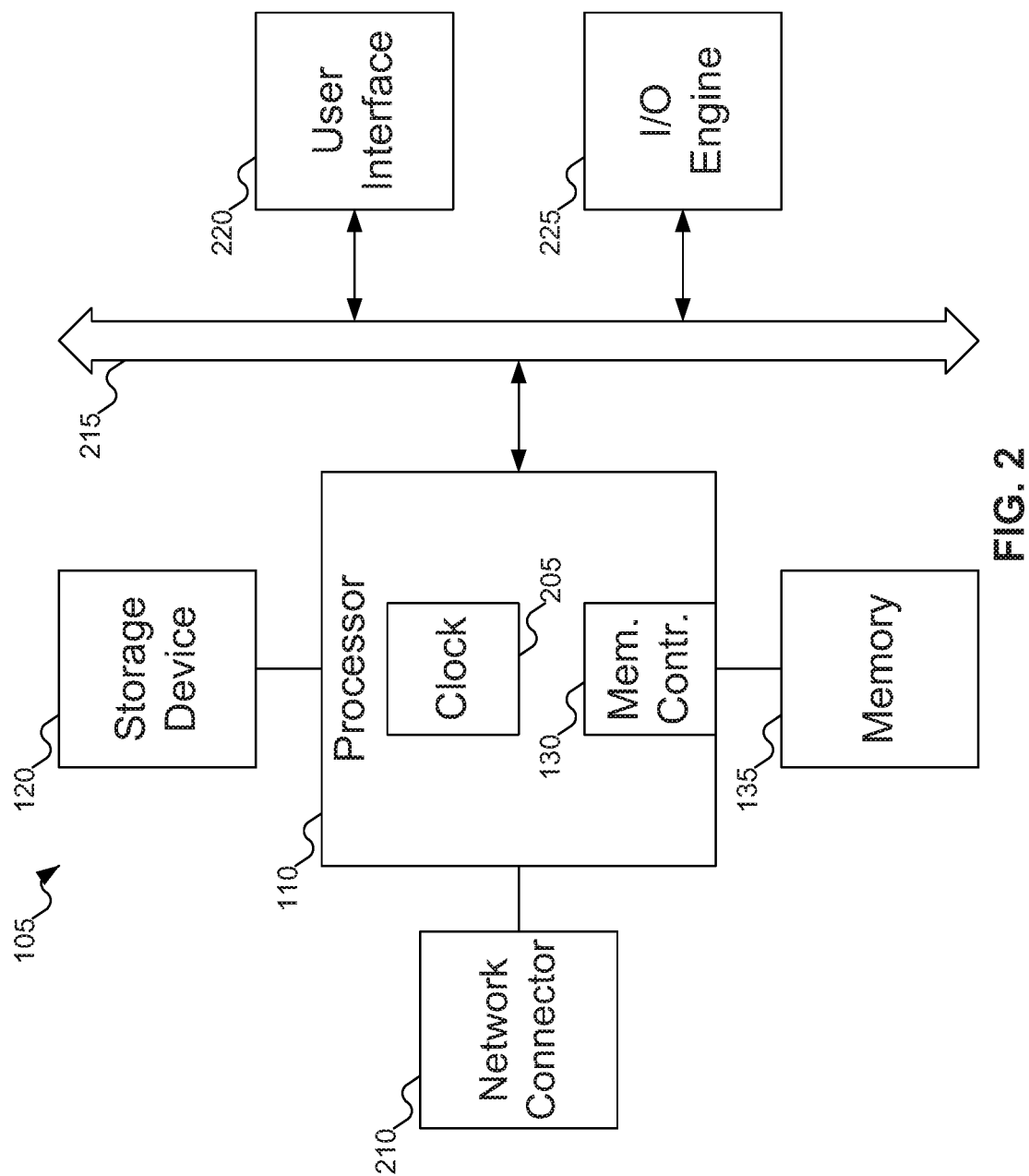
FIG. 2 shows additional details of the machine of FIG. 1.

FIG. 2 shows additional details of the machine of FIG. 1. In FIG. 2, typically, machine 105 includes one or more processors 110, which may include memory controllers 130 and clocks 205, which may be used to coordinate the operations of the components of device 105. Processors 110 may also be coupled to memories 135, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
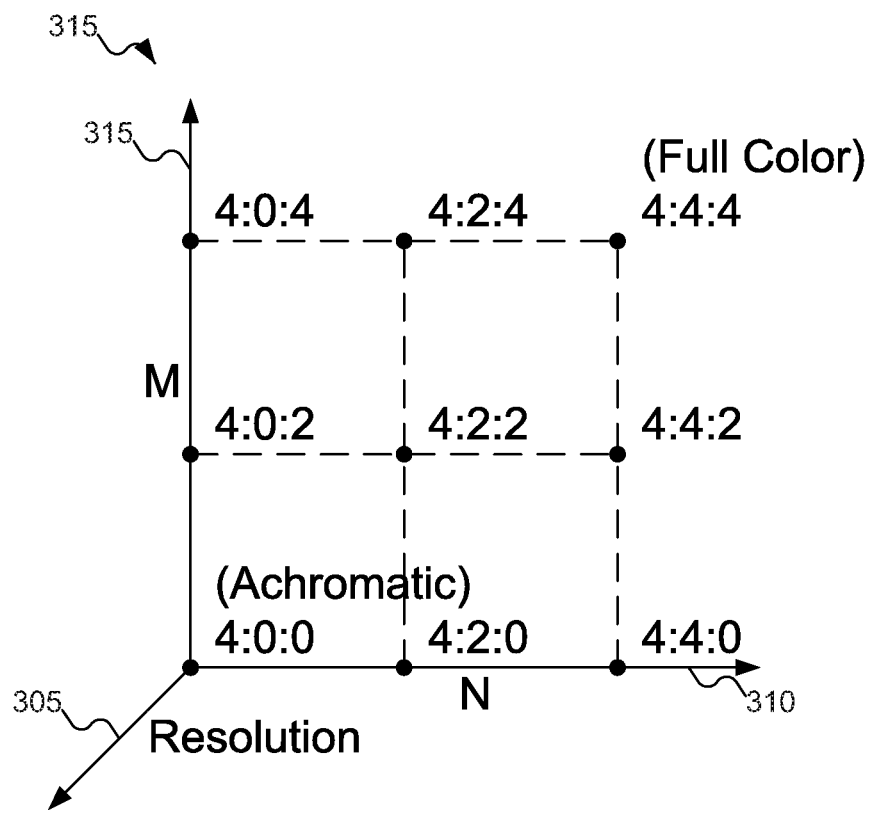
FIG. 3 shows various dimensions including resolution and Chroma Subsampling rates that may be used in embodiments of the inventive concept.

FIG. 3 shows various dimensions including resolution and Chroma Subsampling rates that may be used in embodiments of the inventive concept. Recall that Chroma Subsampling schemes may be represented as 4:N:M, where N and M are usually (but not necessarily always) 0, 2, or 4. In general, the values of N and M reflect the relative Chroma resolution in the horizontal and vertical directions of the image. Thus, for example, the Chroma Subsampling scheme 4:0:0 represents a black-and-white image, with no color data, whereas the Chroma Subsampling scheme 4:4:4 represents a full color image (with color data taken from every pixel).

In FIG. 3, the three-dimensional (resolution, N, M) space consists of a lattice of possible transcoded images with varying resolutions and Chroma Subsample strategies. While resolution (along axis 305) is often represented at discrete levels, such as 25%, 50%, and 100%, the resolution dimension is a resolution continuum, with any values possible. On the other hand, the Chroma subsample dimensions only provide discreet Chroma Subsampling schemes for any given resolution.

In addition, while FIG. 3 shows dimensions N (along axis 310) and M (along axis 315) as separate dimensions, embodiments of the inventive concept may combine these dimensions into a single dimension. That is, instead of N and M representing separate dimensions, the number of Chroma Subsampling schemes are finite in number, and may be listed individually. Thus, for example, a single dimension might be used to represent every possible Chroma Subsampling scheme 4:N:M for the acceptable values of N and M.

Before getting into embodiments of the inventive concept showing data structures that may be used to store image data, a preliminary topic is useful to understand. Aside from storing data objects, KV-SSDs may also store containers. A "container" is a KV data structure that functionally stores multiple KV data objects (or links to multiple data objects through their keys). In essence, the container may become its own mini-KV store, housing keys and associated data, or alternatively just housing a list of keys that reference pointers (other keys) to elsewhere. In a loose sense, containers perform a function for KV-SSDs akin to folders (or directories) in a file system storage device: containers provide a mechanism by which related KV pairs may be grouped together. Note that containers may exist within an individual data object and/or may group together multiple data objects, as the data object in a KV-SSD is pure data, without any externally imposed structure, requirements, or format.

Figure 7:
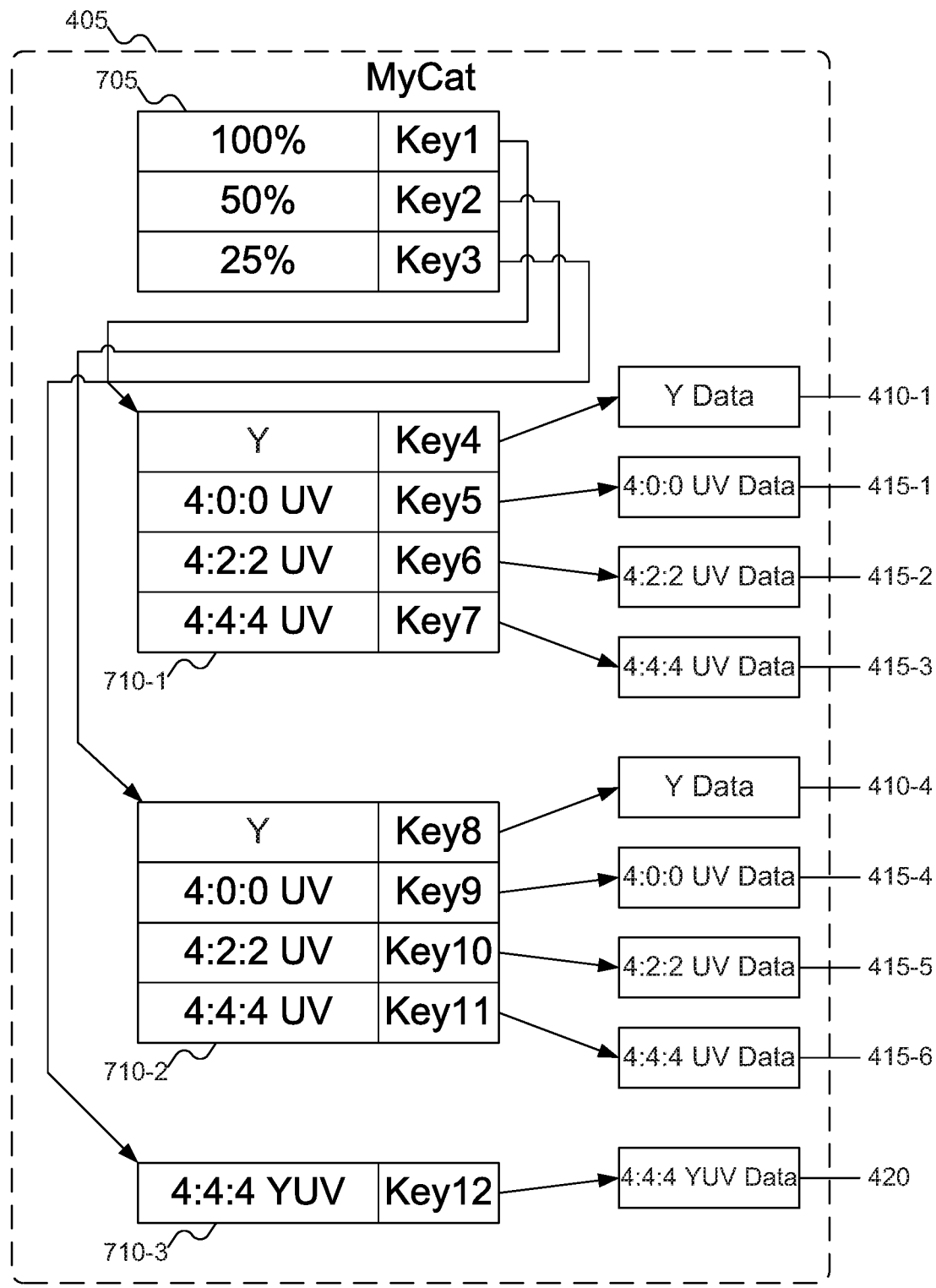

The term "container" is not intended to limit the scope of the claims to just "containers". The term "container" is intended to encompass any data structure that may be used to organize the various values and other image data stored within image object 405. For example, tables may be used to organize the image values, with the tables indexed by values along one dimension, with the entries in the table pointing to other tables or image values that organize the data along one or more additional dimensions, as shown in FIG. 7 below. Thus, for example, image object 405 might alternatively include a first table that contains entries for resolutions of 100%, 50%, and 25%; these entries might point to additional tables that include pointers to the image values 410-1 through 410-6, 415-1 through 415-6, and 420.

Figure 4:
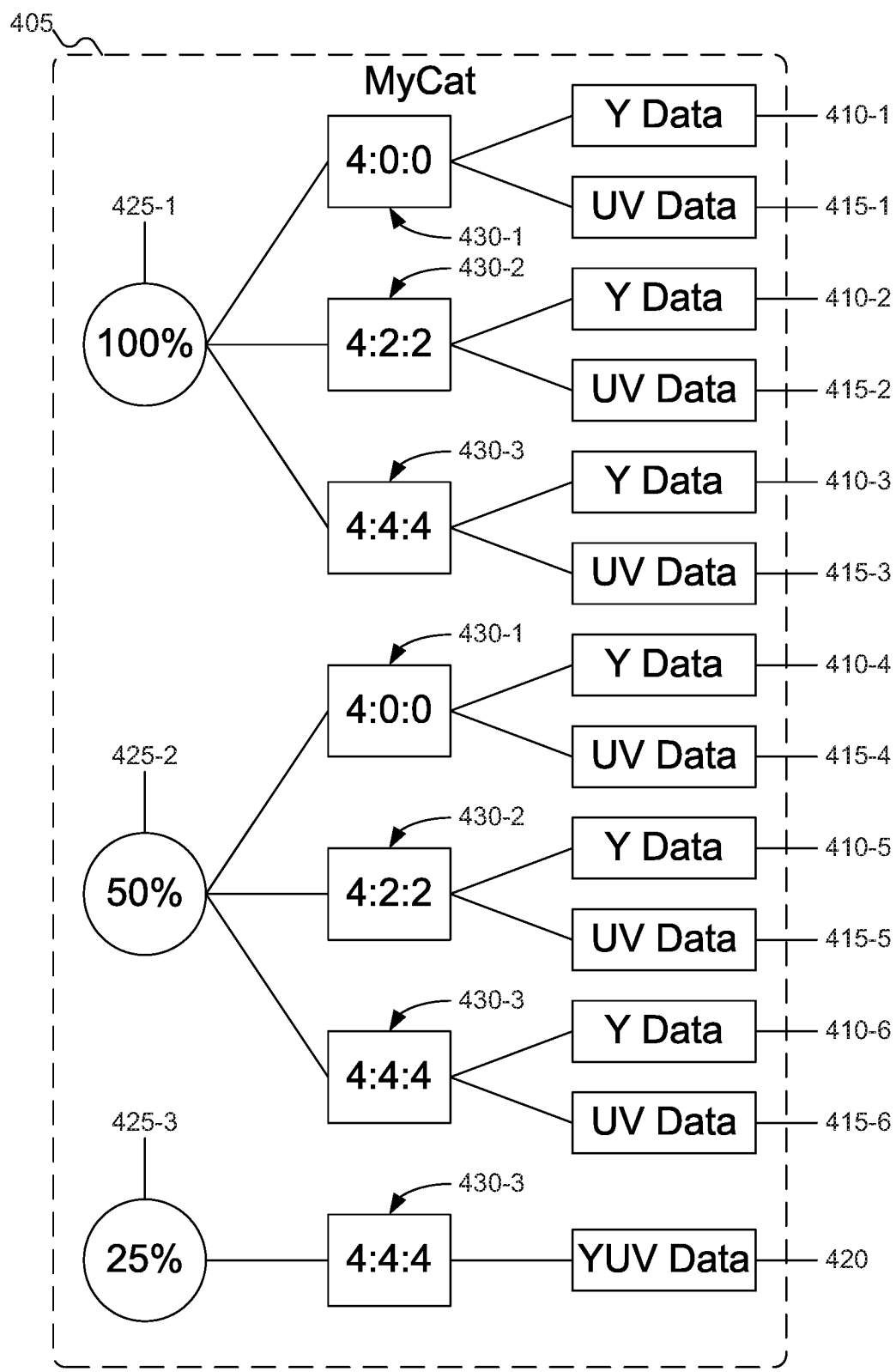
FIGS. 4-7 show various ways in which image values may be organized in an image object, according to embodiments of the inventive concept.

FIGS. 4-11 show various ways in which image values may be organized in an image object, according to embodiments of the inventive concept. In FIG. 4, image object 405 is shown, which stores image data for an image named "MyCat". Image values are organized within image object 405 using resolution as the first dimension and Chroma Subsampling scheme as the second dimension. Thus, for example, containers 425-1, 425-2, and 425-3 store images at resolutions of 100%, 50%, and 25%, respectively.

The resolutions of 100%, 50%, and 25% represent possible scaled resolutions of the original image, and may be replaced with any alternative labels: for example, by using a particular pixel resolution. Thus, for example, if the original image included 640 pixels by 480 pixels (commonly denoted as "640×480"), the 100% label could be replaced with "640×480", the 50% label could be replaced with "320×240", and the 25% label could be replaced with "160×120".

Within each first dimension container, additional containers may be used to store data in a second dimension. Thus, for example, first dimension containers 425-1 and 425-2 each include second dimension containers 430-1, 430-2, and 430-3 to store images using Chroma Subsampling schemes 4:0:0, 4:2:2, and 4:4:4, respectively, and first dimension container 425-3 includes second dimension container 430-3 to store images using Chroma Subsampling scheme 4:4:4.

There are several points worth noting in FIG. 4. First, note that in FIG. 4, second dimension containers 430-1, 430-2, and 430-3 are mostly shown storing the luma and Chroma data separately. For example, container 430-1 stores luma data value 410-1 and Chroma data value 415-1, container 430-2 stores luma data value 410-2 and Chroma data value 415-2, and so on. This is optional: the luma data and Chroma data need not be separated. For example, second dimension container 430-3 in first dimension container 425-3 stores image value 420, which stores the entire image in a single value, rather than separating the luma and Chroma data. Separating the luma and Chroma data has the advantage that if application program 125 of FIG. 1 only needs to process, say, Chroma data 415-1, luma data 410-1 does not need to be retrieved. On the other hand, if application program 125 of FIG. 1 wants the entire image, then both luma data 410-1 and Chroma data 415-1 are retrieved and returned to application program 125 of FIG. 1. This may require re-combining the luma and Chroma data into a single image file, depending on the expectations of application program 125 of FIG. 1.

Second, note that the Chroma Subsampling scheme 4:0:0 is an achromatic image: the image includes no color data. In such an image, the UV data might be non-existent (since the UV data represents the color portion of the image). Thus, Chroma data values 415-1 and 415-4 might not exist as they store no data. They are represented in FIG. 4 for completeness of description, and not because these values must be stored in image object 405.

Third, since the luma data is the same for all images in the same resolution, luma data values 410-1, 410-2, and 410-3 are redundant: only one copy actually needs to be stored. There are many ways in which redundant copies of luma data values 410-1, 410-2, and 410-3 may be eliminated. For example, the luma data value might be stored directly within first dimension container 425-1 rather than within each of second dimension containers 430-1, 430-2, and 430-3. Or, the luma data value might be stored once (for example, within second dimension container 430-1), with second dimension containers 430-2 and 430-3 storing pointers to that value. Embodiments of the inventive concept may extend to include other techniques to eliminate redundant copies of the luma data.

Fourth, while image object 405 is designed to optimize the storage and management of Chroma image values, there is no reason that image object 405 may not store related image data values in other formats. For example, the original image file might have been in RGB format (or JPEG/JPG format, or GIF format, or any other format, whether lossy or lossless) at 640×480 resolution: this image value may also be stored within image object 405. By storing the original image value in image object 405, if application program 125 of FIG. 1 needs the original data file for some reason (as opposed to the 4:4:4 Chroma Subsampling scheme at 100% resolution), that original image may be easily located and retrieved as well.

Fifth, although FIG. 4 shows Chroma data at 4:0:0, 4:2:2, and 4:4:4 Subsampling schemes for images at 100% and 50% resolution, at 25% resolution (first dimension container 425-3) only stores image data for Chroma Subsampling scheme 4:4:4. Thus, it is not required that image object 405 include every possible Chroma Subsampling scheme at every possible resolution. Indeed, since the resolution continuum may be thought of as essentially continuous, requiring or expecting image object 405 to store image data for every possible Chroma Subsampling scheme at every possible resolution is not only unrealistic, it is likely infeasible. But storing a subset of all possible combinations of resolution and Chroma Subsampling scheme (as needed by application program 125 of FIG. 1 using or generating the images) is entirely realistic and feasible.

As a corollary, note that image object 405 may grow as application program 125 of FIG. 1 generates image data in new resolutions and/or Chroma Subsampling schemes. For example, assume application program 125 of FIG. 1 needs to process image data at a 75% resolution using Chroma Subsampling scheme 4:4:4. As may be seen from FIG. 4, no container yet exists to store data in this resolution in image object 405. Upon requesting image data at this resolution, application program 125 of FIG. 1 may learn that no such image data exists. Then, after application program 125 of FIG. 1 generates the needed image data (how this occurs will be discussed below), a new first dimension container may be added to image object 405 for 75% resolution, with an embedded new second dimension container to store data for Chroma Subsampling scheme 4:4:4, into which one or more image values may be stored as generated by application program 125 of FIG. 1. The same principle holds true when application program 125 of FIG. 1 generates new image data at an existing resolution but new Chroma Subsampling scheme; the only difference is that in such a situation a new first dimension container would not be added (since an existing first dimension container represents the generated resolution). (The concept may even be extended to creating image object 405 when the first Chroma data is generated for the image.)

In the situation where application program 125 of FIG. 1 requests image data at a combination of resolution and Chroma Subsampling that does not already exist in image object 405, application program 125 of FIG. 1 will need to generate the required image data. For example, in image object 405, no image data exists for the combination of 25% resolution and Chroma Subsampling scheme 4:0:0. Thus, if application program 125 of FIG. 1 requires image data at this resolution and Chroma Subsampling scheme, application program 125 of FIG. 1 will need to generate this image data.

Conventional application programs already are capable of such image generation, as they may not assume that the required image data already exists, nor do conventional application programs need to be modified to support such data generation. But while application program 125 of FIG. 1 may generate starting from the original image data (which might be, say, image values 410-3 and 415-3, representing image data at full color resolution using YCbCr encoding, or an RGB image value), it might be sufficient for application program 125 of FIG. 1 to start with image data at 50% resolution using Chroma Subsampling scheme 4:0:0 (i.e., image values 410-4 and 415-4) and scale them down to 25% resolution to be stored in first dimension container 425-3 (within a new second dimension container for Chroma Subsampling scheme 4:0:0). Alternatively, application program 125 of FIG. 1 might request any image value stored in first dimension container 425-3 (such as image value 420)—which would be at the correct resolution—and process the image value to extract just the luma data from that image, which again may be stored in first dimension container 425-3 (again, within a newly created second dimension container for Chroma Subsampling scheme 4:0:0). In this manner, image object 405 may grow as new versions of the image are generated by application program 125 of FIG. 1 (or other application programs also operating on image object 405), requiring less overall processing and data movement.

Similar approaches may be taken when application program 125 of FIG. 1 needs an image file that is not achromatic. Application program 125 of FIG. 1 may select an appropriate image value that already exists and modify it accordingly. For example, if application program 125 of FIG. 1 needs Chroma data in a 4:2:4 Subsampling scheme of the image at 50% resolution, application program 125 of FIG. 1 might start with Chroma value 415-6 (50% resolution with full 4:4:4 Chroma Subsampling) and sample the data appropriately to generate the image file in a 4:2:4 Subsampling scheme. Then, application 125 of FIG. 1 may store the generated image value in a new second dimension container of first dimension container 425-2.

As noted above, in FIG. 4 some redundant data is shown. Specifically, the Y (luma) data for a given resolution does not change with the Chroma Subsampling scheme. In other words, image values 410-1, 410-2, and 410-3 are all the same values. In FIG. 4, there is a minor benefit to this redundancy, as a given container hierarchy (such as dimension containers 425-1 and 430-1) may include all pertinent data. But this redundancy may be eliminated by storing data that is independent of the Chroma Subsampling scheme someplace where it may always be found (for example, in dimension container 425-1) or by only storing the data once and including pointers from the various dimension containers to where the data is actually stored. For example, image value 425-1 might be the true data, and image values 425-2 and 425-3 may simply be pointers to image value 425-1. Other embodiments of the inventive concept, such as those shown in FIGS. 6-7, offer other solutions to the possibility of redundant data.

Figure 5:
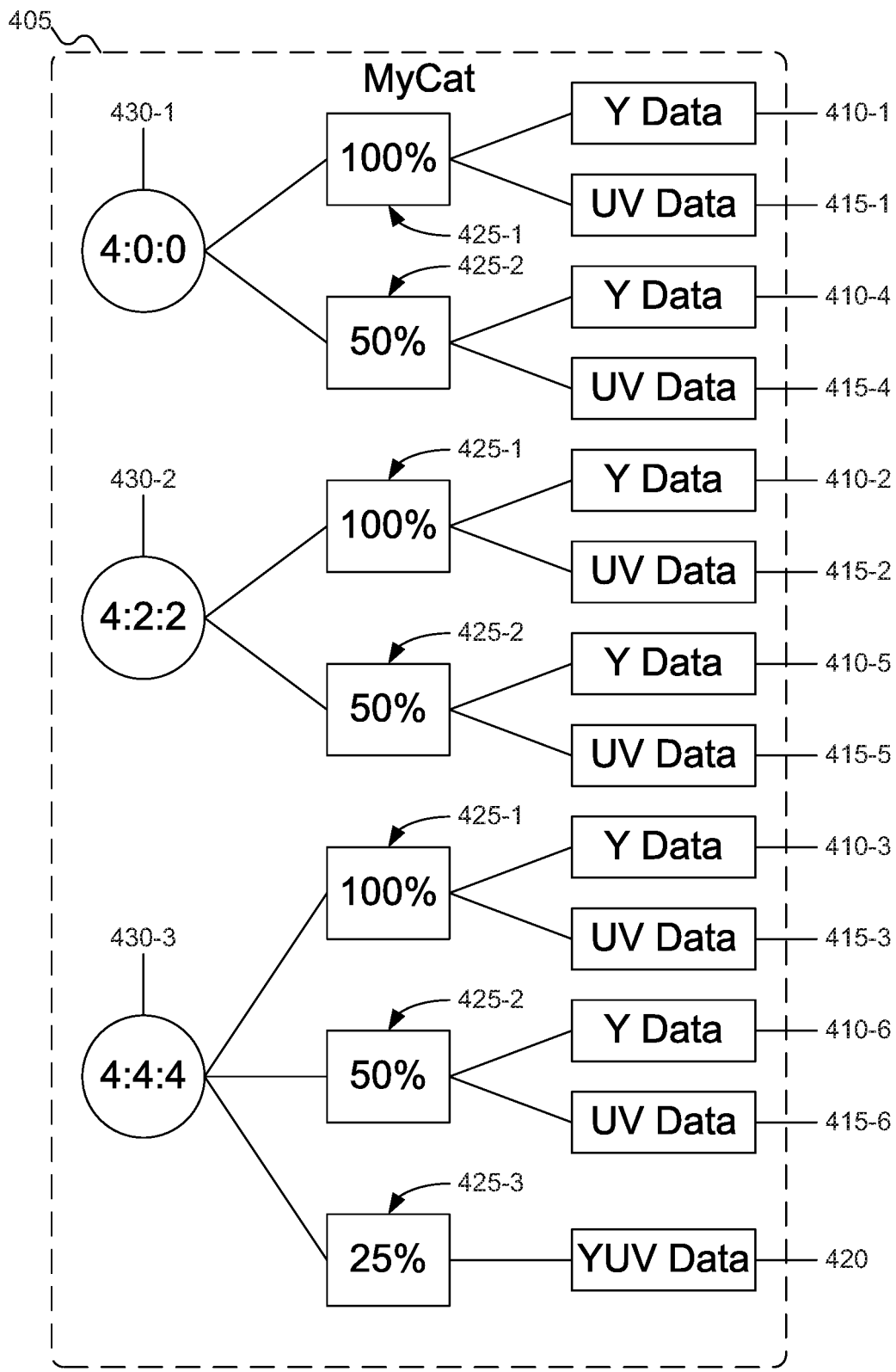

In FIG. 4, the image data is organized first along the resolution dimension, then along the Chroma Subsampling dimension. But embodiments of the inventive concept may organize the image data in other ways. FIG. 5 illustrates organizing the image data first along the Chroma Subsampling dimension, and then along the resolution dimension.

In FIG. 5, first dimension containers 430-1, 430-2, and 430-3 are shown for Chroma Subsampling schemes 4:0:0, 4:2:2, and 4:4:4, respectively. Within each of first dimension containers 430-1, 430-2, and 430-3, second dimension containers 425-1, 425-2, and 425-3 are used to organize image data according to resolution. As with FIG. 4, image object 405 in FIG. 5 does not have to store containers that represent every combination of resolution and Chroma Subsampling scheme. Thus, for example, first dimension containers 430-1 and 430-2 do not include second dimension container 425-3, which is stored only within first dimension container 430-3. This organization reflects that image object 405 only stores image data at 25% resolution using the 4:4:4 Chroma Subsampling scheme.

In embodiments of the inventive concept as shown FIGS. 4-5 (and in other embodiments of the inventive concept as well), application program 125 of FIG. 1 may provide the keys/containers that help KV-SSD 120 of FIG. 1 to identify the particular image value to retrieve. For example, assume that image object 405 contained the image values for an image named "MyCat". Application program 125 of FIG. 1 might provide a KV request using the key "MyCat4:2:250Chroma". KV-SSD 120 of FIG. 1 could parse this information into a series of "internal" keys/containers: "MyCat" (the key/container identifying image data object 405), "4:2:2" (a first key/container, identifying the desired Chroma Subsampling scheme), "50" (a second key/container identifying the desired resolution), and "Chroma" (the key for the particular image value desired). Using this parse, KV-SSD 120 of FIG. 1 may, for example, locate image object 405 of FIG. 5 (which in some embodiments of the inventive concept may be thought of as a container itself), then container 430-2 within image object 405, then container 425-2 within container 430-2, and finally image value 415-5 within container 425-2. Note that while this example leaves it to KV-SSD 120 of FIG. 1 to determine where one piece of the provided information ends and another begins, embodiments of the inventive concept may use explicit characters to separate the portions of the provided information. For example, if "l" is considered a special character for parse purposes and does not appear in any key or container name, then application program 125 of FIG. 1 might provide "MyCat/4:2:2/50/Chroma" to explicitly indicate how to parse the provided information.

Application program 125 of FIG. 1 may also provide such information in the embodiments of the inventive concept shown in FIGS. 6-7 and 9-11 below, although the specific information provided (and how it is parsed) may depend on the embodiment of the inventive concept being used. For example, in the embodiments of the inventive concept shown in FIGS. 4-5 above, both the desired resolution and the desired Chroma Subsampling scheme may be containers used to isolate the desired image value; in the embodiment of the inventive concept shown in FIG. 6 below, one of these indicators may be part of the key used to locate the desired image value.

In yet other embodiments of the inventive concept, rather than expecting KV-SSD 120 of FIG. 1 to parse the provided information, application program 125 of FIG. 1 might provide the key and the container information separately. Thus, continuing the example above, to access the Chroma value for the file "MyCat" at 50% resolution and Chroma Subsampling scheme 4:2:2, application program 125 might provide (as separate inputs) key "MyCatChroma" and container "50/4:2:2" (or "4:2:2/50"). By separating the containers from the key, KV-SSD 120 may more efficiently search for the desired image value (since KV-SSD 120 would not need to parse the input information to attempt to identify the container(s)).

While FIGS. 4-5 (and FIGS. 6 and 9-10 below) show dimension containers 425-1, 425-2, 425-3, 430-1, 430-2, and 430-3 all within image object 405, embodiments of the inventive concept may organize the image data using other mechanisms. For example, first dimension container 425-1 might include all image data that are at full (100%) resolution (or, alternatively, all image data that are at a particular pixel resolution, such as 640×480); within first dimension container 425-1, second dimension container 430-1 may group together all image values (that are at 100% resolution) that use the 4:0:0 Chroma Subsampling scheme. Thus, for application program 125 of FIG. 1 to retrieve the image data at 100% resolution that uses Chroma Subsampling scheme 4:0:0 (UV data 415-1), application program 125 of FIG. 1 may specify the desired resolution (100%) and the desired Chroma Subsampling scheme (4:0:0) to identify the particular container to search for the value associated with a particular key. It should be readily apparent how FIGS. 4-5 (as well as FIGS. 6-7 and 9-11 below) may be generalized to use containers 425-1, 425-2, and 425-3 to store image values for all images, and not just those that are considered part of image object 405.

It is also worth noting that, due to the isolation imposed upon containers, in some embodiments of the inventive concept keys may be locally unique rather than globally unique across KV-SSD 120. For example, consider again FIGS. 4-5, where containers 425-1, 425-2, 425-3, 430-1, 430-2, and 430-3 organize the image values within image object 405. Given the specific image object 405 and a particular set of containers that isolate the particular desired image value, the key used to retrieve the image value might be reduced to just "Luma" or "Chroma". For example, in FIG. 4, if application program 125 of FIG. 4 were to specify image object 405 and containers 425-1 and 430-1, application program has already reduced the set of image values to just image values 410-1 and 415-1. By providing the key "Luma" or "Chroma", KV-SSD 120 may select between these two image values. Note that the same key ("Luma" or "Chroma") may distinguish between the files in each of the other second dimension containers 430-2 and 430-3. Thus, the keys themselves are only locally unique within container 430-1, and not globally unique across KV-SSD 120 of FIG. 1, or even unique within image object 405: but since the container hierarchy prevents key collisions, KV-SSD 120 of FIG. 1 may still return the desired image value.

Figure 6:
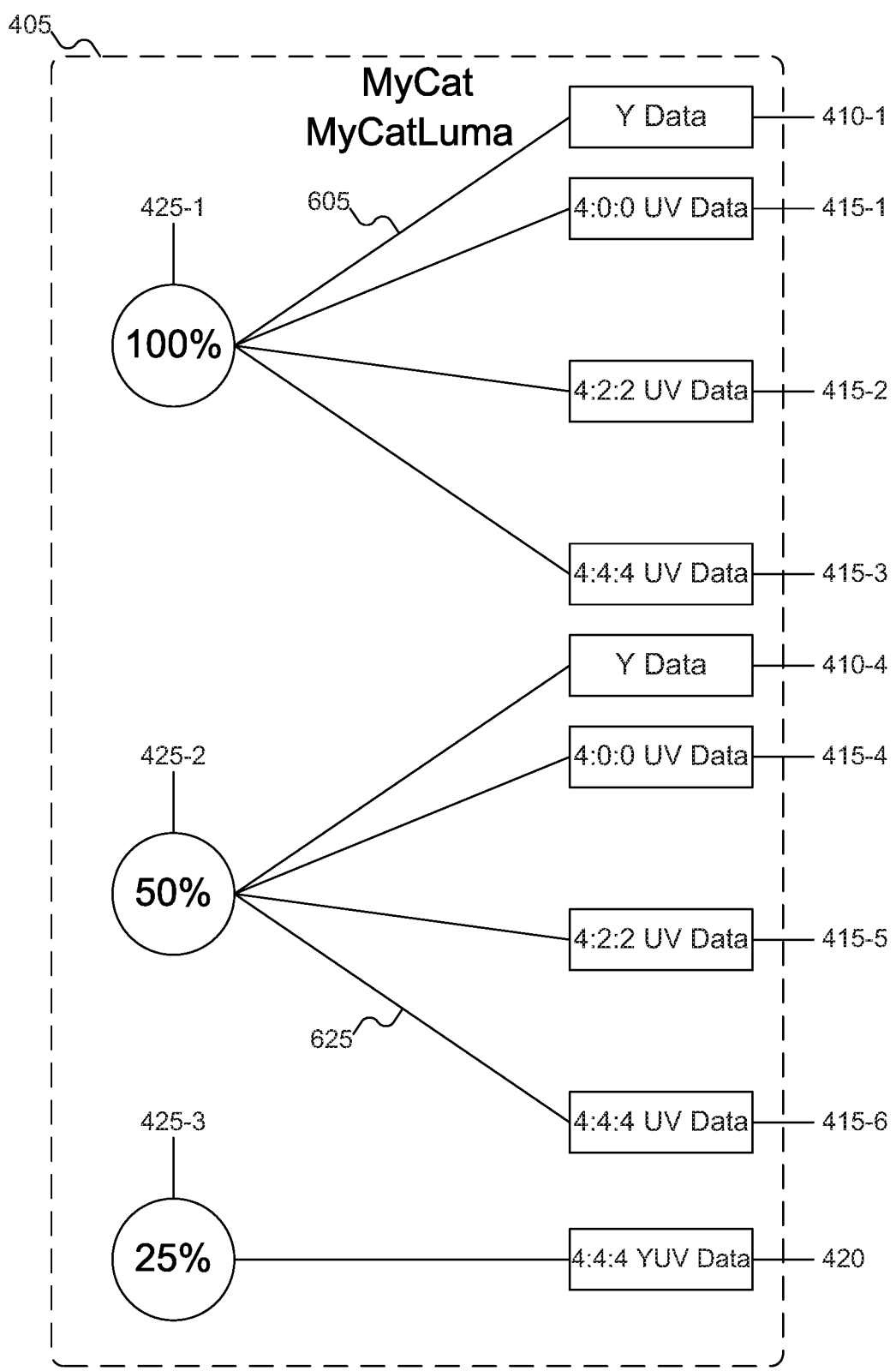

FIG. 6 illustrates another embodiment of the inventive concept. In FIG. 6, the image data is organized first along the resolution dimension, as in FIG. 4. But rather than organizing the data within first dimension containers 425-1 425-2, and 425-3, a key may be used to identify the particular image value desired. Thus, first dimension container 425-1 directly contains image values 410-1, 410-2, 410-3, 415-1, 415-2, and 415-3, rather than indirectly (through second dimension containers 430-1, 430-2, and 430-3, as in FIG. 4). To select a particular image value, such as the luma data for the image at 100% resolution, application program 125 of FIG. 1 may specify first dimension container 425-1 along with a key that uniquely identifies the desired value from first dimension container 425-1.

For example, to select the luma data for an image named "MyCat" at 100% resolution, application program 125 of FIG. 1 might provide the information "100MyCatLuma" ("MyCat100Luma", or any other desired ordering of the desired image value key and container information: as long as KV-SSD 120 of FIG. 1 may parse the information, the specific order may not matter). This information uniquely identifies the desired image value, as shown by link 605. In a similar manner, providing the information "50MyCat4:4:4Chroma" would uniquely identify the full Chroma Subsampling data for the image "MyCat" at 50% resolution. Note that by changing the name of the image (e.g., to "MyDog") would retrieve the same type of data, but for a different image, using the same dimension container hierarchy.

When FIG. 6 is organized as shown, there is an implicit additional level of hierarchy: image object 405 itself. That is, containers 425-1, 425-2, and 425-3 are not global to the entirety of KV-SSD 120 of FIG. 1, but are "part" of image object 405—in essence, image object 405 may be structured as a container itself. In that sense, containers 425-1, 425-2, and 425-3 are specific to image object 405, and any containers with the same label in different image objects may be considered different containers. Since the image data would be organized first by image object, and then by dimension containers, the individual image values are still uniquely identified, even with different containers (in different image objects) labeled identically. In other embodiments of the inventive concept, FIG. 6 may be organized so that containers 425-1, 425-2, and 425-3 are at the highest level (higher than any individual image objects. Such an organization reduces the number of containers (which are themselves data objects) on KV-SSD 120 of FIG. 1, but then the key would need to specify image object 405 to distinguish among image values in the same container which may represent the same resolution and/or Chroma Subsampling scheme, but for different images.

It is also possible to store image data on KV-SSD 120 of FIG. 1 without using any "containers" at all. The term "containers" is quoted because there may still be a data structure that organizes image values, but in FIG. 7 application program 125 of FIG. 1 may be responsible for retrieving this data structure, accessing its data, and making additional requests from KV-SSD 120 of FIG. 1, rather than KV-SSD 120 of FIG. 1 processing information that specifies both the desired image value and any hierarchical structure organizing the desired image value. (If KV-SSD 120 of FIG. 1 is responsible for receiving the hierarchical information as well as the key of the desired image value, then FIG. 7 may be thought of as demonstrating a structure for the containers shown in FIGS. 4-6, but implementation is otherwise unchanged from the embodiments of the inventive concept shown in FIGS. 4-6.)

In FIG. 7, application program 125 of FIG. 1 may provide a key for an image object representing all stored variations of the image data, regardless of resolution or Chroma Subsampling scheme. This key does not actually return image data; instead, this key accesses an object that stores table 705, which is analogous to first dimension container 425-1 of FIG. 4: table 705 stores information about different resolutions of the image stored on KV-SSD 120. Each different resolution is associated with another key: for example, 100% resolution is associated with key1, 50% resolution is associated with key2, and 25% resolution is associated with key3.

Application program 125 of FIG. 1 may then provide the key associated with the desired resolution to KV-SSD 120. For example, key1 may identify an object that stores table 710-1, key2 may identify an object that stores table 710-2, and key3 may identify an object that stores table 710-3. Tables 710-1, 710-2, and 710-2 are analogous to second dimension tables 430-1, 430-2, and 430-3 of FIG. 4, in that they further narrow the set of image values that might be desired. Application program 125 of FIG. 1 may then use the information in the retrieved table to select the specific image value desired. For example, if application program 125 of FIG. 1 desires the image value storing the luma data for the image at 100% resolution, application program 125 of FIG. 1 may provide key1 to KV-SSD 120, retrieve table 710-1, locate key4, provide key4 to KV-SSD 120, and receive image value 410-1.

The advantages and disadvantages of FIG. 7 relative to other embodiments of the inventive concept should be apparent. Where application program 125 of FIG. 1 receives tables 705, 710-1, 710-2, and/or 710-3 from KV-SSD 120 of FIG. 1, application program 125 of FIG. 1 knows exactly what image values are stored on KV-SSD 120 of FIG. 1, and therefore may avoid requesting an image value that is not currently stored on KV-SSD 120 of FIG. 1. Therefore, application program 125 of FIG. 1 does not need to address the possibility of receiving a "no-value" message (described below with reference to FIG. 8) from KV-SSD 120 of FIG. 1.

The disadvantage of the embodiment of the inventive concept shown in FIG. 7 is that application program 125 of FIG. 1 may need to make multiple read requests of KV-SSD 120 before ultimately receiving the desired image value. For example, performing three read requests as described above means that application program 125 of FIG. 1 is three times as likely to be delayed due to one or more Garbage Collection operations (performed by SSD storage devices to recover erased data blocks for reuse). Depending on the latency of KV-SSD 120, the time KV-SSD 120 may need to perform Garbage Collection, and the speed at which application program 125 of FIG. 1 is expected to operate, performing multiple read requests of KV-SSD 120 may be unacceptably slow.

As discussed above, FIG. 5 above represents the same information as in FIG. 4, but organized using dimensions 315, 310, and 305 of FIG. 3 in a different order. While alternative organizations of the information shown in FIGS. 6-7 are not shown, embodiments of the inventive concept may extend to include variations on FIGS. 6-7 where the information is organized along the various dimensions 315, 310, and 305 in different orders.

When application program 125 of FIG. 1 needs image files, application program 125 of FIG. 1 obviously could request the entire image object 405 of FIGS. 4-7 and then locate the pertinent image values. But that approach requires transmitting a large amount of data that application program 125 of FIG. 1 ultimately does not need. For example, if application program 125 of FIG. 1 is only interested in Chroma data for the image at 50% resolution using Chroma Subsampling scheme 4:2:2, application program 125 of FIG. 1 has no need for any other image values: transmitting them would waste resources and energy (within KV-SSD 120 of FIG. 1, application program 125 of FIG. 1 and machine 105 of FIG. 1, and any communications paths connecting application program 125 of FIG. 1 and KV-SSD 120 of FIG. 1). Thus, embodiments of the inventive concept may benefit from being able to isolate the desired image values at KV-SSD 120 of FIG. 1 and only transmitting those image values actually needed by application program 125 of FIG. 1.

Figure 8:
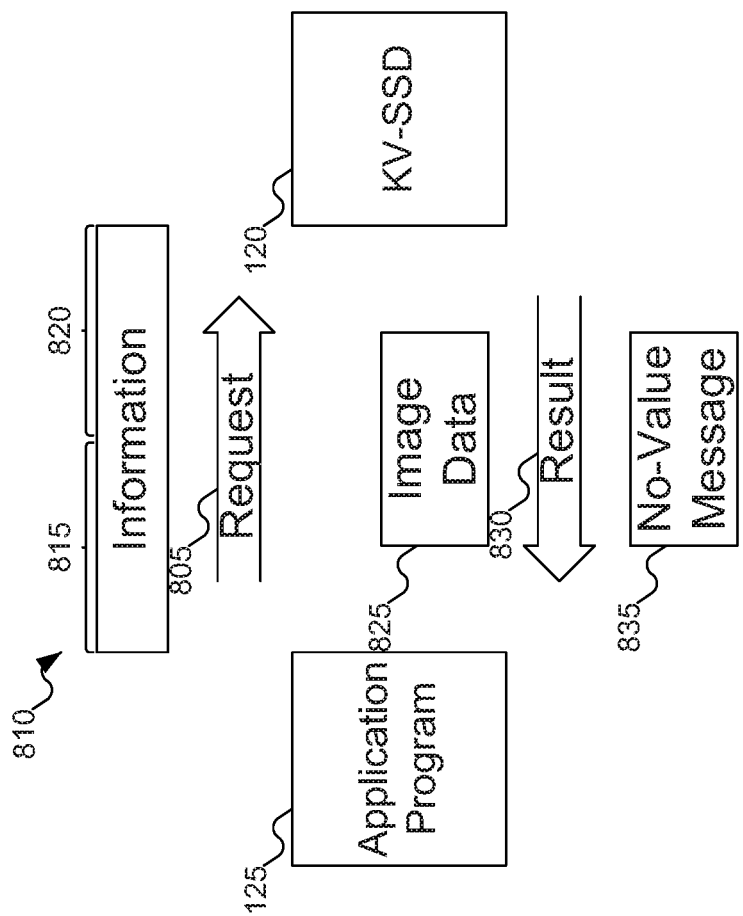
FIG. 8 shows the application program requesting image data from the image object of FIGS. 4-7 in the KV-SSD of FIG. 1 and receiving results.

FIG. 8 shows application program 125 of FIG. 1 requesting image data from image object 405 of FIGS. 4-7 in the KV-SSD of FIG. 1 and receiving results. In FIG. 8, application program 125 may issue read request 805, sent to KV-SSD 120. Request 805 may include information 810, which may specify key 815 and/or container 820. Key 815 may specify image object 405 of FIGS. 4-7, much like the key in any key-value pair may be used to identify the particular object storing the desired data. Container 820 may be used to isolate the particular container within image object 405 of FIGS. 4-7, so that only the image values stored in that container are retrieved and returned.

Note that information 810 may consist of just key 815 or container 820, or information 810 may include both key 815 and container 820, depending on the embodiment of the inventive concept. And while FIG. 8 suggests that information 810 may be divided equally into key 815 and container 820, embodiments of the inventive concept may have key 815 and container 820 "mixed" together in information 810, leaving it to KV-SSD 120 to parse key 815 and container 820 from information 810. For example, as described above with reference to FIGS. 4-5, information 810 might be "MyCat4: 2:250Chroma", which may include containers "4:2:2" and "50" (the Chroma Subsampling scheme and resolution, respectively) as container 820, with "MyCatChroma" representing key 815.

For example, consider again FIG. 4. Assume that key "0x1234" identifies image object 405. Application program 125 of FIG. 8 may send information 810 of FIG. 8 as "0x1234/100%/4:4:4". Key 0x1234 may map to image object 405, and container "100%/4:4:4" may identify, first, container 425-1, and then container 430-3 within container 425-1. KV-SSD 120 of FIG. 8 may then identify that application program 125 of FIG. 1 specifically wants image values 410-3 and 415-3 (assuming they exist, as discussed below).

Returning to FIG. 8, KV-SSD 120 may then retrieve image values 410-3 and 415-3. These image values may then be prepared as image data 825, which may be returned to application program 125 in result 830.

Now, what if image object 405 of FIGS. 4-7 does not store the requested image values? For example, what if key 810 were still "0x1234", but container 820 were specified as, say, "50%/4:2:4"? A glance at image object 405 of FIG. 4 shows that there is no container labeled 4:2:4. In this situation, KV-SSD 120 may return "no-value" message 835 to application program 125 to report that no value could be found matching provided information 810. In this situation, application program 125 may request image values using another information 810. For example, application program 125 might be able to work with image at a different resolution or Chroma Subsampling (or both), or application program 125 might be able to generate the requested image data from the alternative image values. Other alternatives would be to return the original image value, or to return all image values: in either case, permitting application program 125 to generate (in some manner) the image file at the desired resolution and Chroma Subsampling scheme.

Note also that in some embodiments of the inventive concept—for example, the embodiments shown in FIG. 7 (and FIG. 11 below)—application program 125 of FIG. 1 may have enough information to know what combinations of resolution and Chroma Subsampling schemes are available, enabling application program 125 of FIG. 1 to determine what available image value is the best starting point from which to generate the desired image file (or, alternatively, to use directly without generating a new image file). Embodiments of the inventive concept may include KV-SSD 120 of FIG. 1 returning information about the available image values to application program 125 of FIG. 1—such as the information stored in each container in image object 405 of FIGS. 4-7—whether or not KV-SSD 120 of FIG. 1 returns "no-value" message 835, giving application program 125 of FIG. 1 a more complete picture of the image values stored on KV-SSD 120 of FIG. 1 for its own uses.

Note that once application program 125 has requested data from image object 405 of FIGS. 4-7 from KV-SSD 120, KV-SSD 120 may expect that application program 125 will do other things with image object 405 of FIGS. 4-7. This is particularly (although not exclusively) true when KV-SSD 120 returns "no-value" message 835: KV-SSD 120 may expect application program 125 to request data using another information 810, and also that application program 125 may write new image values to image object 405 of FIGS. 4-7. Thus, KV-SSD 120 may keep image object 405 of FIGS. 4-7 ready for further requests from application program 125: for example, by storing image object in Dynamic Random Access Memory (DRAM) within KV-SSD 120. By keeping image object 405 of FIGS. 4-7 ready, KV-SSD 120 may expedite future requests from application program 125, permitting application program 125 to begin processing the image data sooner.

In the above description, request 805 is described as a read request. But application program 125 may also issue a write request, to write a new image value to image object 405 of FIGS. 4-7. When application program issues request 805 as a write request, KV-SSD 120 may use key 815 as before to identify image object 405 of FIGS. 4-7, and container 820 to identify the particular container within image object 405 of FIGS. 4-7 to store the new image value. KV-SSD 120 may also use container 820 to create new container(s) within image object 405 of FIGS. 4-7 to store the new image value (if the specified container combination does not already exist within image object 405 of FIGS. 4-7).

Conventional KV-SSDs are designed to return the entirety of the object (the "value") associated with key 815. KV-SSD 120 may be modified to support extracting the desired data from image object 405 of FIGS. 4-7 without returning the entirety of image object 405 of FIGS. 4-7 in any desired manner. For example, KV-SSD 120 may be modified so that only the desired data (as identified by container 820) is read from the storage in KV-SSD 120. Or, KV-SSD might use conventional key-value read mechanisms to retrieve the entire image object 405 of FIGS. 4-7, but then store image object 405 of FIGS. 4-7 in local storage associated with an in-storage computing processor, and then use the in-storage computing processor to extract the desired data, which is then returned to application program 125 (without returning the rest of image object 405 of FIGS. 4-7). Note that image object 405 of FIGS. 4-7 may be retained in local storage within KV-SSD 120 in the expectation that application program 125 might need to further access image object 405 of FIGS. 4-7 (either by reading other image data or writing a new image value).

FIGS. 4-7 above show various different ways in which the image values may be organized. But it may occur that different application programs 125 of FIG. 1 each want to access image values in image object 405, but expect the containers to be organized in different ways. For example, one application program might expect the image values to be organized as in FIG. 4, whereas another application program might expect the image values to be organized as in FIG. 5. If image object 405 of FIGS. 4-7 were locked into one or the other manner of organization, one or the other application program might be unable to access image values from image object 405 of FIGS. 4-7.

One possible solution would be to permit KV-SSD 120 to reorganize the container 820. For example, if image object 405 were organized as in FIG. 5 but application program 125 provided container 820 as "100%/4:0:0", KV-SSD 120 could change the order of the containers to "4:0:0/100%", which could then be used to locate image values 410-1 and 415-1 of FIG. 5. Essentially, KV-SSD 120 might parse key 815 and/or container 820 from information 810 to determine the various dimensions represented within information 810, and then reconstruct information 810 appropriate to the particular structure used to store the image values. The risk is that permitting KV-SSD 120 to change container 820 as provided by application program 125 might result in an incorrect rearrangement, leaving KV-SSD 120 unable to satisfy request 805.

Figure 9:
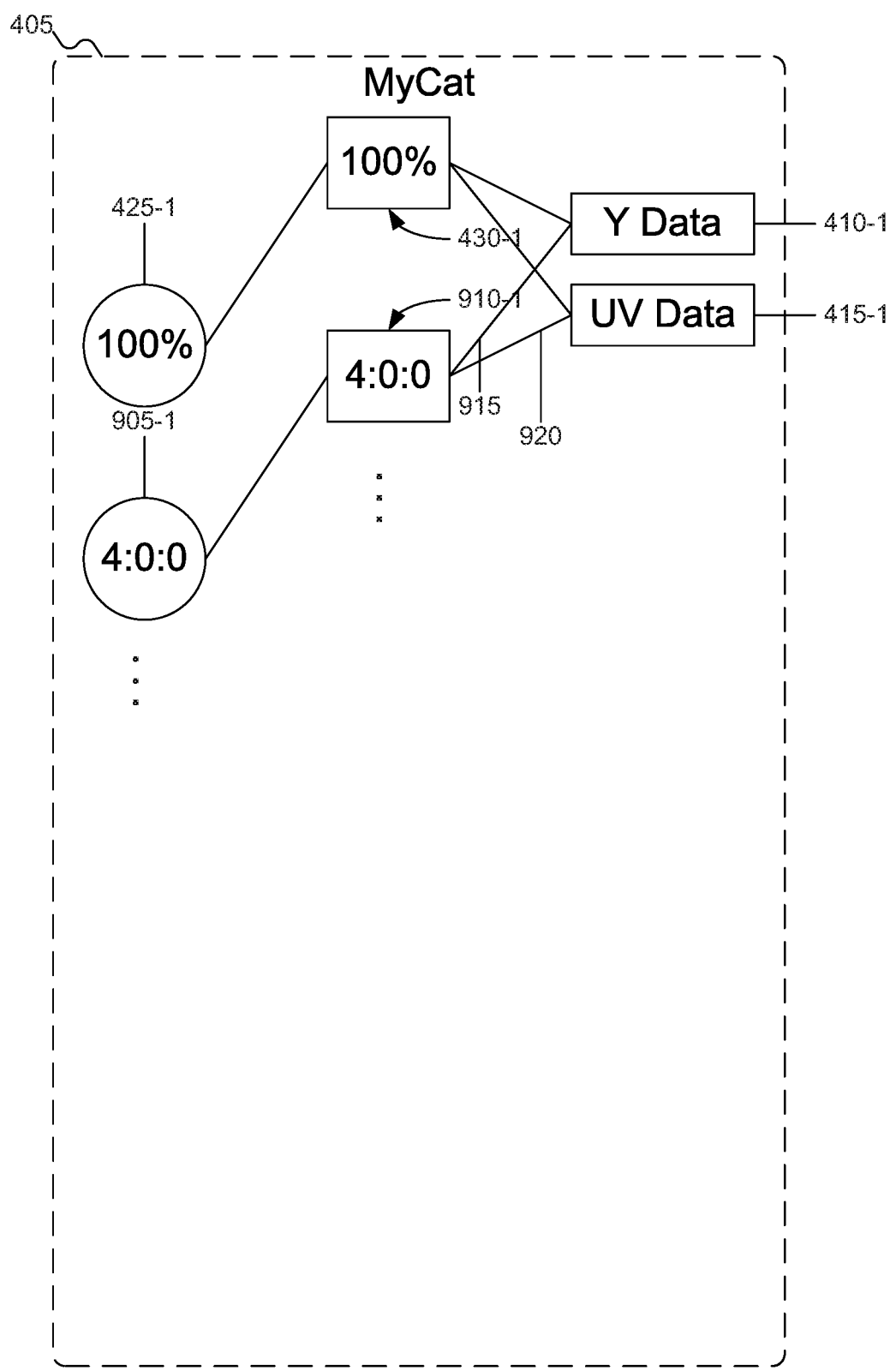
FIGS. 9-11 show other ways in which the image values of FIGS. 4-7 may be organized in the image object of FIGS. 4-7, according to embodiments of the inventive concept.

Instead, embodiments of the inventive concept may include both organizations shown in FIGS. 4-7 to be combined in a single image object. For example, consider FIG. 9 (which presents a much-reduced illustration relative to both FIGS. 4-5, but is sufficient for comprehension). As in FIG. 4, image object 405 includes first dimension container 425-1 and second dimension container 430-1, which may uniquely locate image values 410-1 and 415-1. This arrangement permits application program 125 of FIG. 8 to provide container 820 of FIG. 8 as "100%/4:0:0". But in addition, FIG. 9 shows image object 405 as also including a third container 905-1 and fourth container 910-1. Third container 905-1 and fourth container 910-1 are essentially first dimension container 430-1 and second dimension container 425-1, respectively, of FIG. 5. Further, fourth container 910-1 may include pointers to image values 410-1 and 415-1, so that it appears as if image values 410-1 and 415-1 are located within fourth container 910-1 as well. Thus, application program 125 of FIG. 8 may provide container 820 of FIG. 8 as "4:0:0/100%", and still locate image values 410-1 and 415-1.

Note that containers 425-1 and 905-1 are both first dimension containers, but using different dimensions, and containers 430-1 and 910-1 are both second dimension containers, but (again) using different dimensions. In effect, image object 405 of FIG. 9 combines both data structures from FIGS. 4-5. In this manner, application program 125 of FIG. 8 does not need to worry about the particular order in which container 820 of FIG. 8 is specified.

Figure 10:
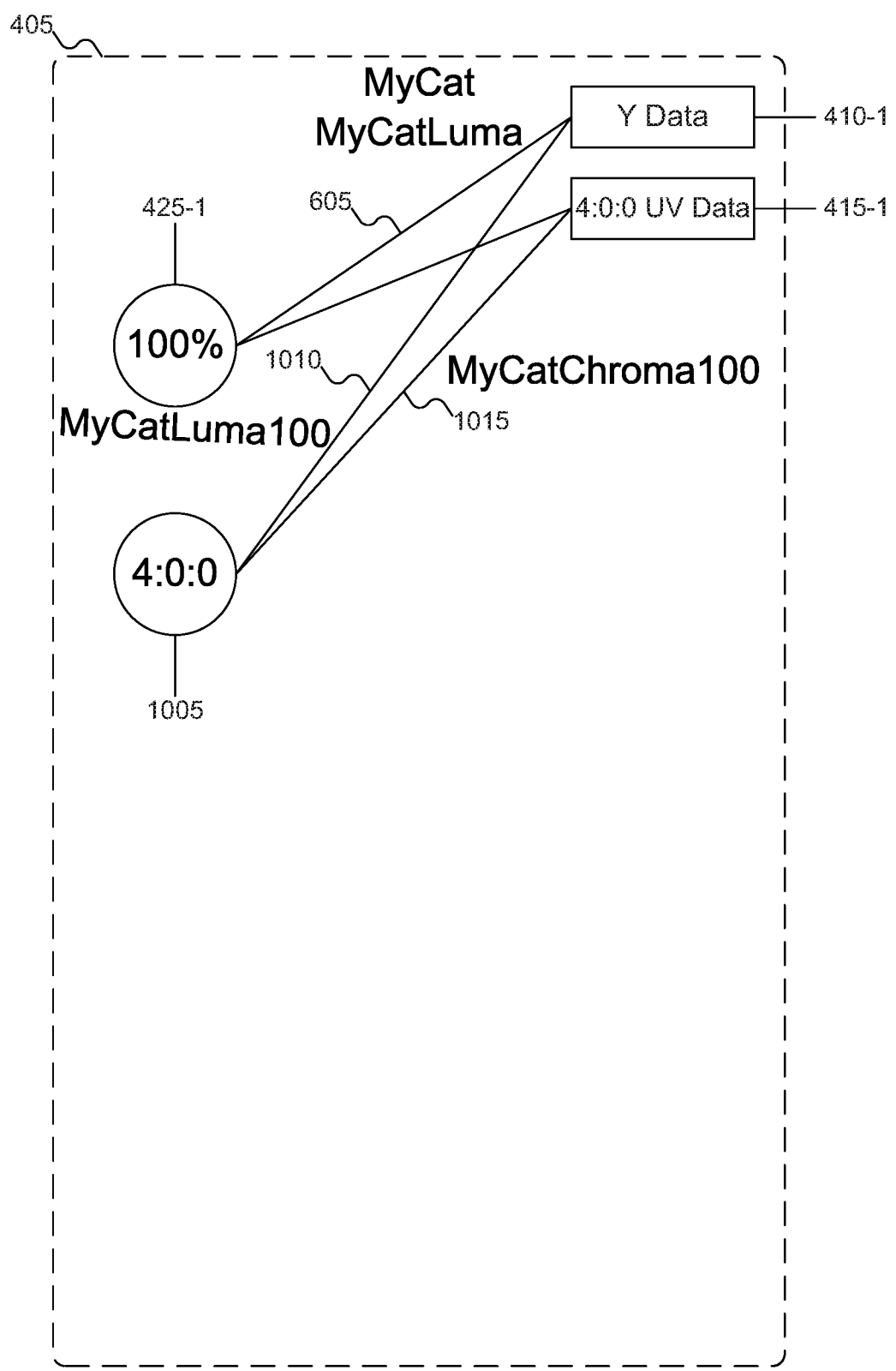

FIG. 10 is similar to FIG. 9, but shows a variation on the embodiment of the inventive concept shown in FIG. 6. Like FIG. 9, FIG. 10 is a reduced presentation sufficient for comprehension. In FIG. 10, two first dimension containers 425-1 and 1005 are shown: first dimension container 425-1 uses resolution as the first dimension, whereas first dimension container 1005 uses the Chroma Subsampling scheme as the first dimension. Both first dimension containers 425-1 and 1005 identify image values 410-1 and 415-1. But whereas the key "MyCatLuma" would be paired with first dimension container 425-1 to uniquely identify image value 410-1 (note that the key "MyCatLuma" includes information about what Chroma Subsampling scheme data is being requested as part of the key), the key "MyCatLuma100" would be paired with first dimension container 1005 to use link 1010 to access image value 410-1. The reason the key to use link 1010 would still need to include "Luma" is because the Chroma data may include multiple different Chroma files, even for a given Chroma Subsampling scheme: as shown in FIG. 6, the luma and Chroma data may be stored as separate image values. Similarly, to access image value 415-1 using first dimension container 1005 would require key "MyCatChroma100" to specify that the Chroma data is desired, for the image at 100% resolution.

Figure 11:
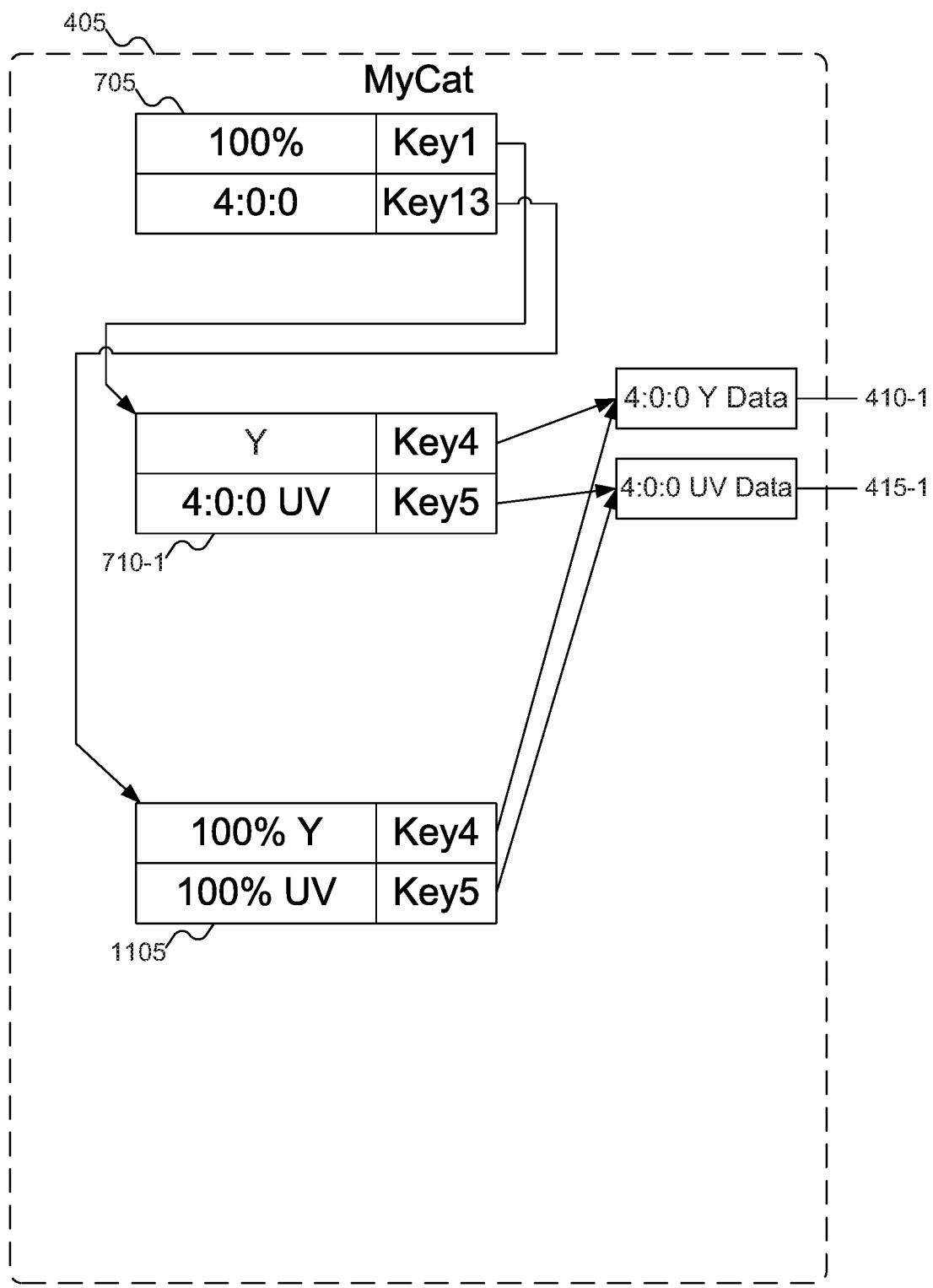

FIG. 11 is also similar to FIG. 9, but shows a variation on the embodiment of the inventive concept shown in FIG. 7. Like FIGS. 9-6, FIG. 11 is a reduced presentation sufficient for comprehension. In FIG. 11, table 705 may include entries along more than one dimension. Application program 125 of FIG. 1 may locate the entry in table 705 that represents the desired value for the dimension of interest, and use the associated key to access additional information. Thus, for example, if application program 125 of FIG. 1 were using resolution first, application program 125 of FIG. 1 may access key1 from table 705; otherwise, application program 125 of FIG. 1 may access key 13 from table 705. Either way, application program 125 of FIG. 1 may provide the selected key to KV-SSD 120, and receive either table 710-1 or table 1105 in response. But note that in both tables 710-1 and 1105, the keys for image objects 410-1 and 415-1 are the same, enabling application program 125 of FIG. 1 to access image objects 410-1 and 415-1 using the dimensions in any desired order.

Figure 12:
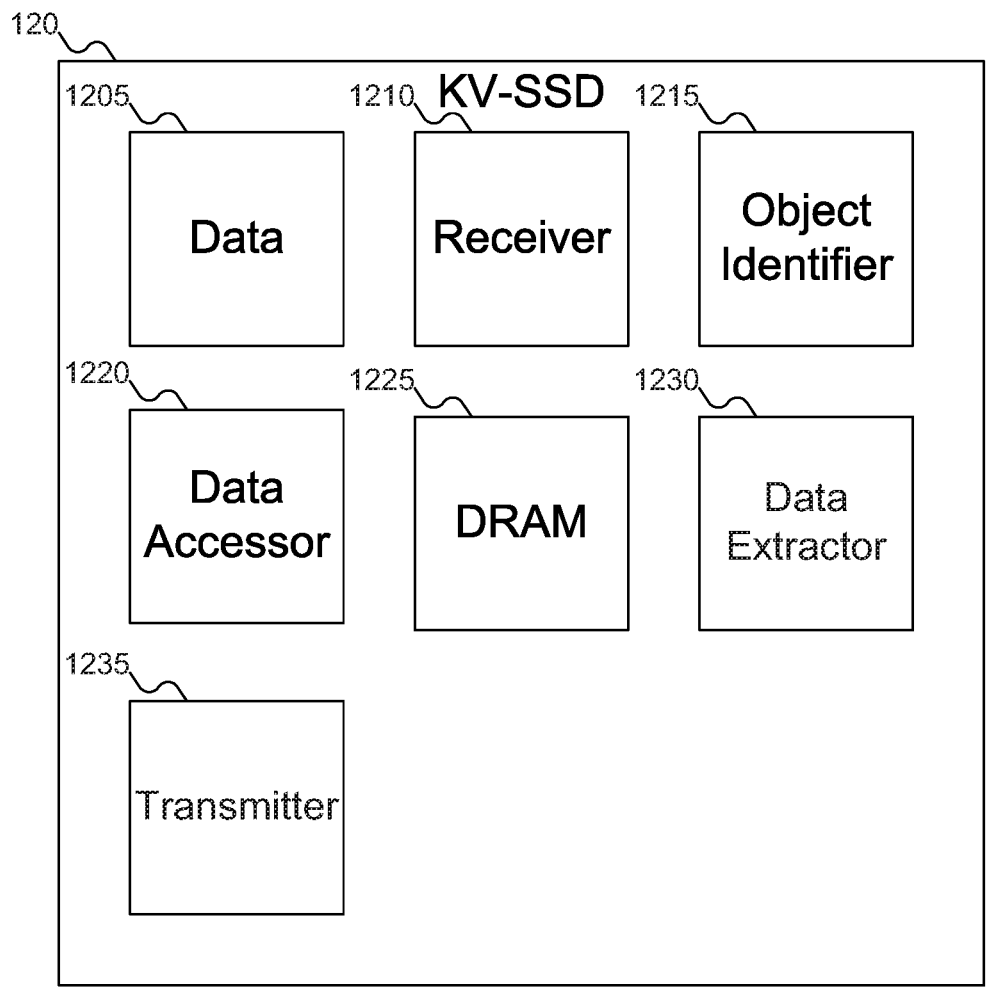
FIG. 12 shows details of the KV-SSD of FIG. 1.

FIG. 12 shows details of KV-SSD 120 of FIG. 1. In FIG. 12, a much-simplified KV-SSD 120 is shown, omitting details about how data is stored on flash memory chips in KV-SSD 120, the interface with machine 105 of FIG. 1, and other such details that are unchanged relative to conventional KV-SSDs.

In FIG. 12, KV-SSD 120 may include data 1205. Data 1205 may be stored in flash memory chips or any other desired format that may be used with KV-SSD 120: data 1205 may include image object 405 of FIGS. 4-7 and 9-11. KV-SSD 120 may also include receiver 1210, object identifier 1215, data accessor 1220, DRAM 1225, data extractor 1230, and transmitter 1235. Receiver 1210 may receive requests, such as request 805 of FIG. 8, from application program 125 of FIG. 1. As described above with reference to FIG. 8, request 805 may be either a read request or a write request, and may include information 810 and image data (if new image values are to be written to image object 405 of FIGS. 4-7 and 9-11). Object identifier 1215 may take key 815 of FIG. 8 from information 810 and map key 815 of FIG. 8 to an object stored in data 1205. Data accessor 1220 may then access image object 405 of FIGS. 4-7 and 9-11, as identified by object identifier 1215, from data 1205. DRAM 1225 may be used to store a copy of image object 405 of FIGS. 4-7 and 9-11 in a faster form of storage, in the expectation that image object 405 of FIGS. 4-7 and 9-11 will be used again. Although FIG. 12 shows DRAM 1225, embodiments of the inventive concept may store image object 405 of FIGS. 4-7 and 9-11 in other forms of storage than DRAM: any other form of storage may be used, as desired. Data extractor 1230 may extract particular image values from image object 405 of FIGS. 4-7 and 9-11: for example, if container 820 of FIG. 8 is "100%/4:0:0", data extractor 1230 may extract image values 410-1 and 415-1. Finally, transmitter 1235 may transmit any extracted image values (or the entirety of image object 405 of FIGS. 4-7 and 9-11, if appropriate) to application program 125 of FIG. 8.

Figure 13A:
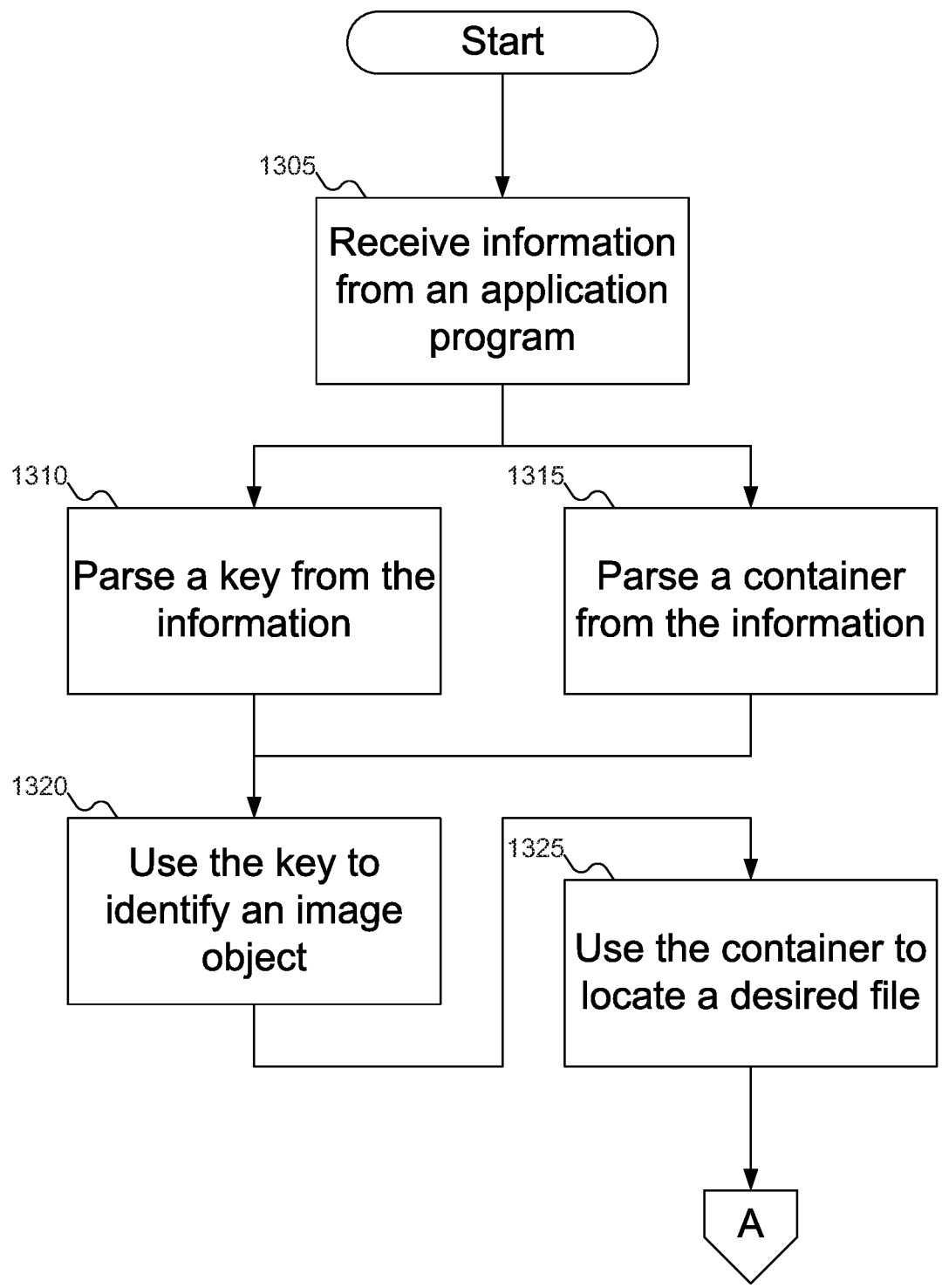
FIGS. 13A-13B show a flowchart of an example procedure for the KV-SSD of FIG. 1 to respond to a request for image data in the image object of FIGS. 4-5 and 9 in the KV-SSD of FIG. 1, according to an embodiment of the inventive concept.
Figure 13B:
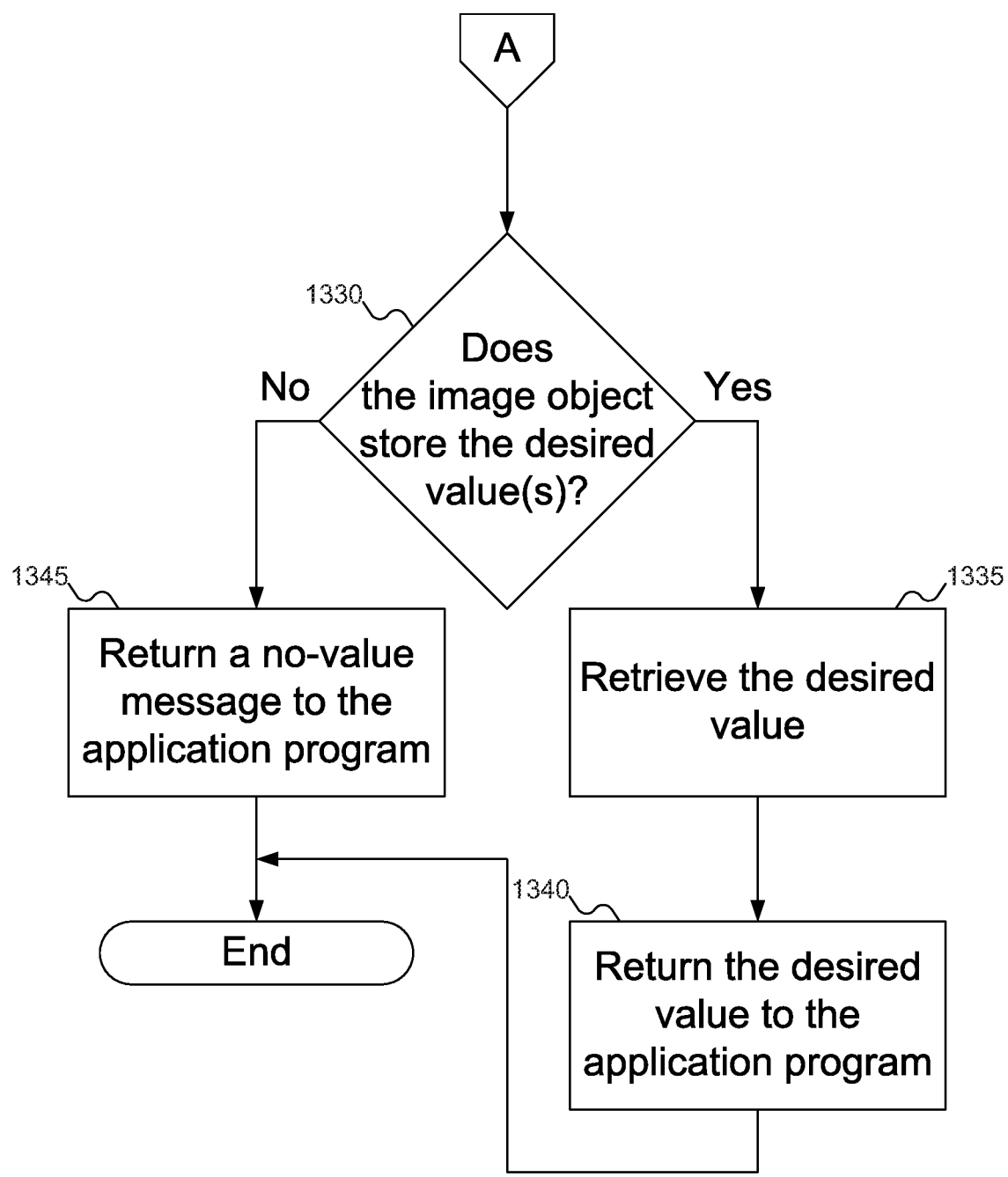

FIGS. 13A-13B show a flowchart of an example procedure for KV-SSD 120 of FIG. 1 to respond to a request for image data in image object 405 of FIGS. 4-5 and 9 in the KV-SSD of FIG. 1, according to an embodiment of the inventive concept. In FIG. 13A, at block 1305, receiver 1210 of FIG. 12 may receive request 805 of FIG. 8 from application program 125 of FIG. 8, which may include information 810 of FIG. 8. In FIGS. 13A-13B, request 805 is intended to be a read request: write requests are described in FIG. 14. At block 1310, KV-SSD 120 of FIG. 1 may parse information 810 of FIG. 8 to identify key 815 of FIG. 8 within information 810 of FIG. 8. At block 1315, KV-SSD 120 of FIG. 1 may parse information 810 of FIG. 8 to identify container 820 of FIG. 8 within information 810 of FIG. 8. Note that blocks 1310 and 1315 are not exclusive: depending on the embodiment of the inventive concept, either of blocks 1310 and 1315 may be executed or both blocks 1310 and 1315 may be executed, and in either order. At block 1320, object identifier 1215 of FIG. 12 may use key 815 of FIG. 8 from information 810 of FIG. 8 to identify image object 405 of FIGS. 4-5 and 9. At block 1325, data accessor 1220 of FIG. 12 may use container 820 of FIG. 8 from information 810 of FIG. 8 to identify a particular container in image object 405 of FIGS. 4-5 and 9 containing the desired image data.

At block 1330 (FIG. 13B), KV-SSD 120 of FIG. 8 may determine if the desired image values exist: for example, the desired image values might not exist if their containers do not exist. If the desired image values exist, then at block 1335 data accessor 1220 of FIG. 12 accesses the image values, and at block 1340 transmitter 1235 of FIG. 12 may transmit the accessed image values to application program 125 of FIG. 8. If the desired image values do not exist, then at block 1345 transmitter 1235 of FIG. 12 may transmit a "no-value" message to application program 125 of FIG. 8.

Figure 14:
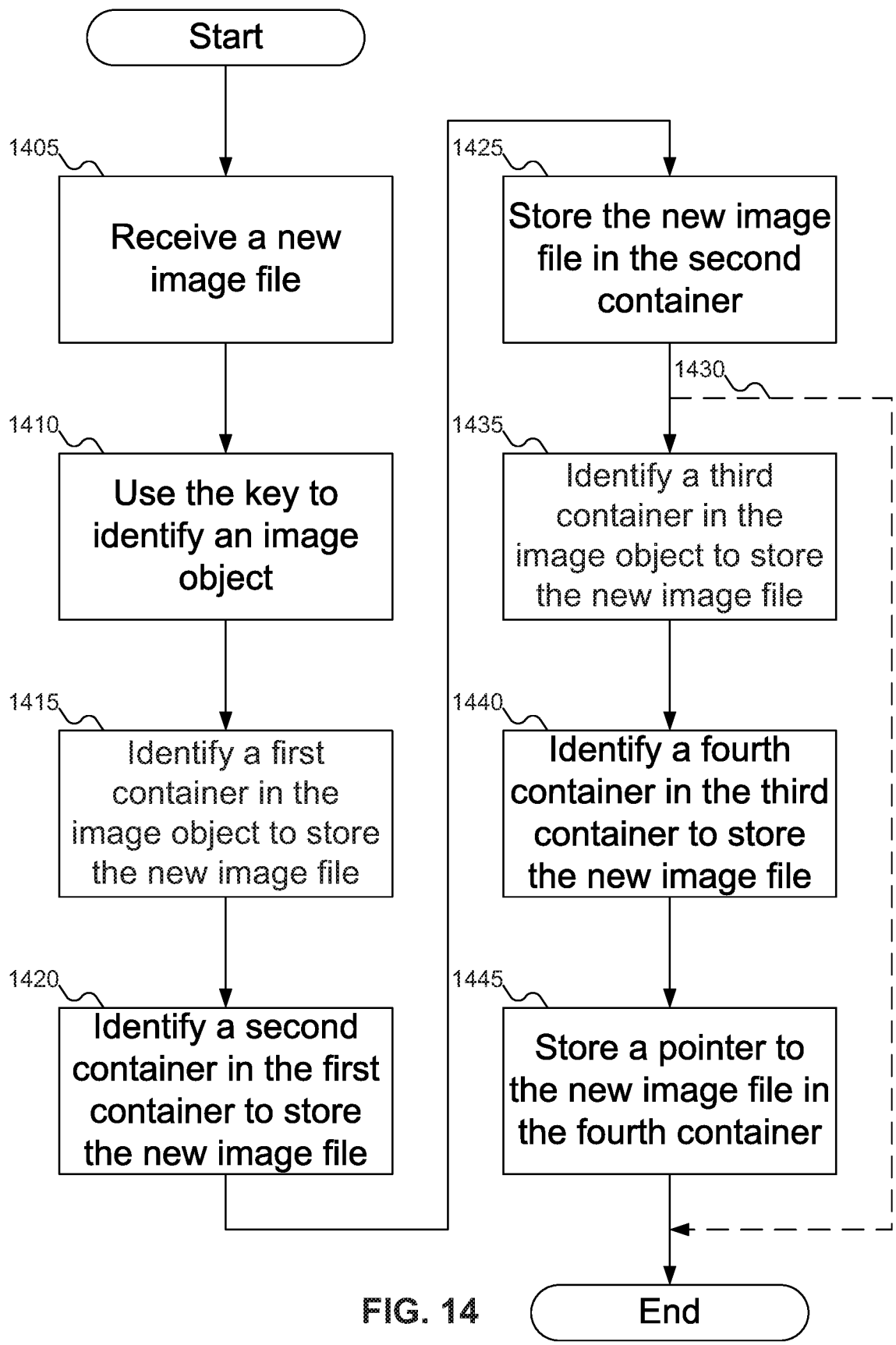
FIG. 14 shows a flowchart of an example procedure for the KV-SSD of FIG. 1 to store a new image value in the image object of FIGS. 4-5 and 9, according to an embodiment of the inventive concept.

FIG. 14 shows a flowchart of an example procedure for KV-SSD 120 of FIG. 1 to store a new image value in image object 405 of FIGS. 4-5 and 9, according to an embodiment of the inventive concept. In FIG. 14, at block 1405, receiver 1210 of FIG. 12 may receive request 805 of FIG. 8, along with information 810 of FIG. 8 and a new image file (or more than one new image file) from application program 125 of FIG. 8. At block 1410, object identifier 1215 of FIG. 12 may use key 815 of FIG. 8 from information 810 of FIG. 8 to identify image object 405 of FIGS. 4-5 and 9. At block 1415, data accessor 1220 of FIG. 12 may use container 820 of FIG. 8 from information 810 of FIG. 8 to identify a target first dimension container in image object 405 of FIGS. 4-5 and 9. At block 1420, data accessor 1220 of FIG. 12 may use container 820 of FIG. 8 from information 810 of FIG. 8 to identify a target second dimension container in image object 405 of FIGS. 4-5 and 9. In the remaining discussion of FIG. 14, it is assumed that the target first dimension container and the target second dimension containers exist; if not, then KV-SSD 120 of FIG. 8 may create these containers within image object 405 of FIGS. 4-5 and 9 as needed to proceed.

At block 1425, KV-SSD 120 of FIG. 8 may store the new image value(s) in the target second dimension container, after which processing may conclude (as shown by dashed arrow 1430). But if image object 405 of FIGS. 4-5 and 9 includes multiple overlapping container structures as described above with reference to FIG. 9, then at block 1435 KV-SSD 120 of FIG. 8 may locate another first dimension container that ought to contain the new image value (for example, by changing the order of containers within container 820 of FIG. 8 from information 810 of FIG. 8), and at block 1440 KV-SSD 120 of FIG. 8 may locate another second dimension container that ought to contain the new image value. Finally, at block 1445, KV-SSD 120 of FIG. 8 may store the new image value in the additional second dimension container (or link the image value stored in block 1425 to the additional second dimension container, perhaps using a pointer). Although FIG. 14 as shown completes processing at this point, control may also return again to block 1435 to repeat the process to store the new image value in yet another container path, if appropriate.

Figure 15:
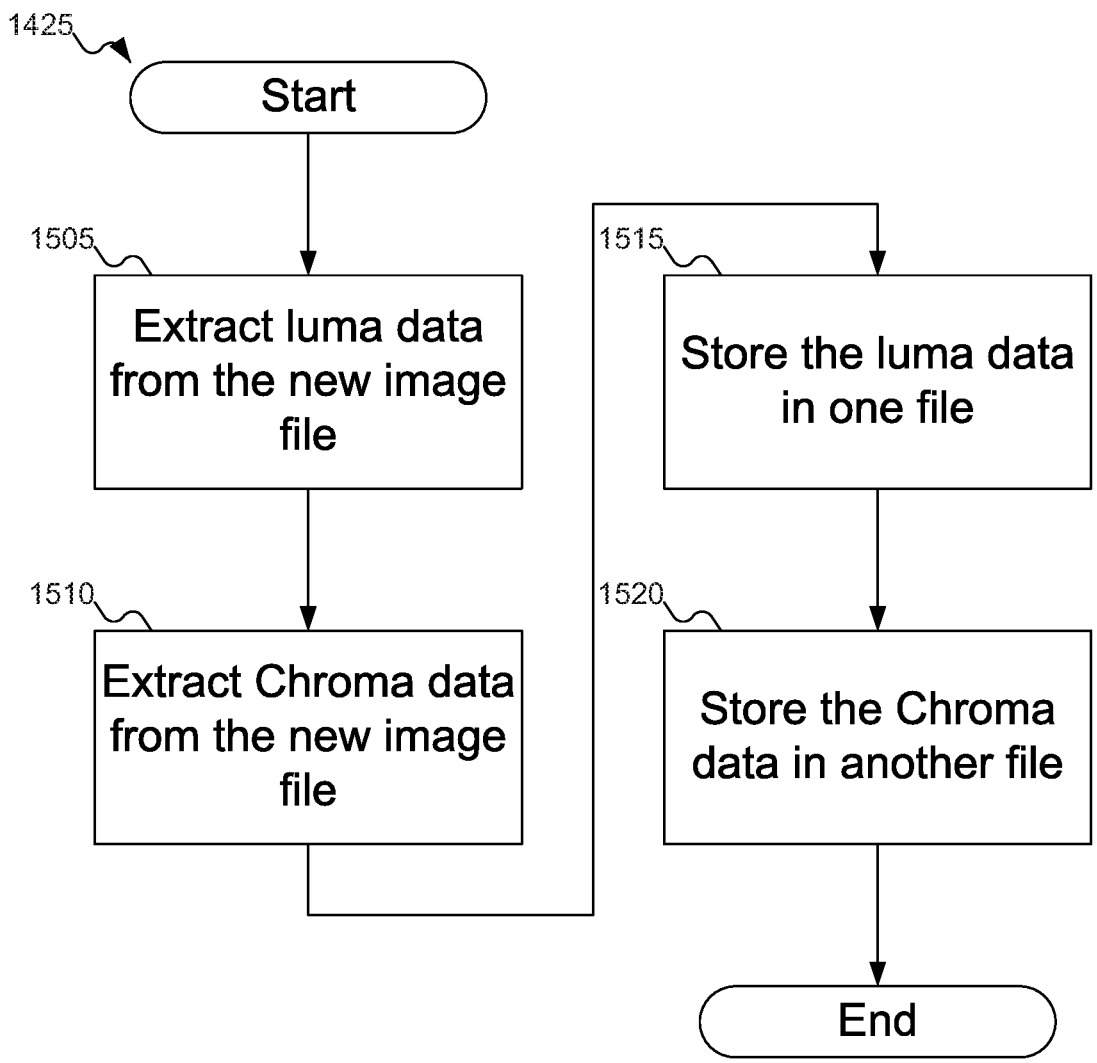
FIG. 15 shows a flowchart of an example procedure for the KV-SSD of FIG. 1 to store a new image value in the image object of FIGS. 4-5 and 9, according to an embodiment of the inventive concept.

FIG. 15 shows a flowchart of an example procedure for KV-SSD 120 of FIG. 1 to store a new image value in image object 405 of FIGS. 4-5 and 9, according to an embodiment of the inventive concept. In FIG. 15, at block 1505, data extractor 1230 of FIG. 12 may extract the luma data from the new image file, and at block 1510, data extractor 1230 of FIG. 12 may extract the Chroma data from the new image file. At block 1515, KV-SSD 120 of FIG. 8 may store the extracted luma data in one value in data 1205 of FIG. 12, and at block 1520, KV-SSD 120 of FIG. 8 may store the extracted Chroma data in another value in data 1205 of FIG. 12.

Figure 16A:
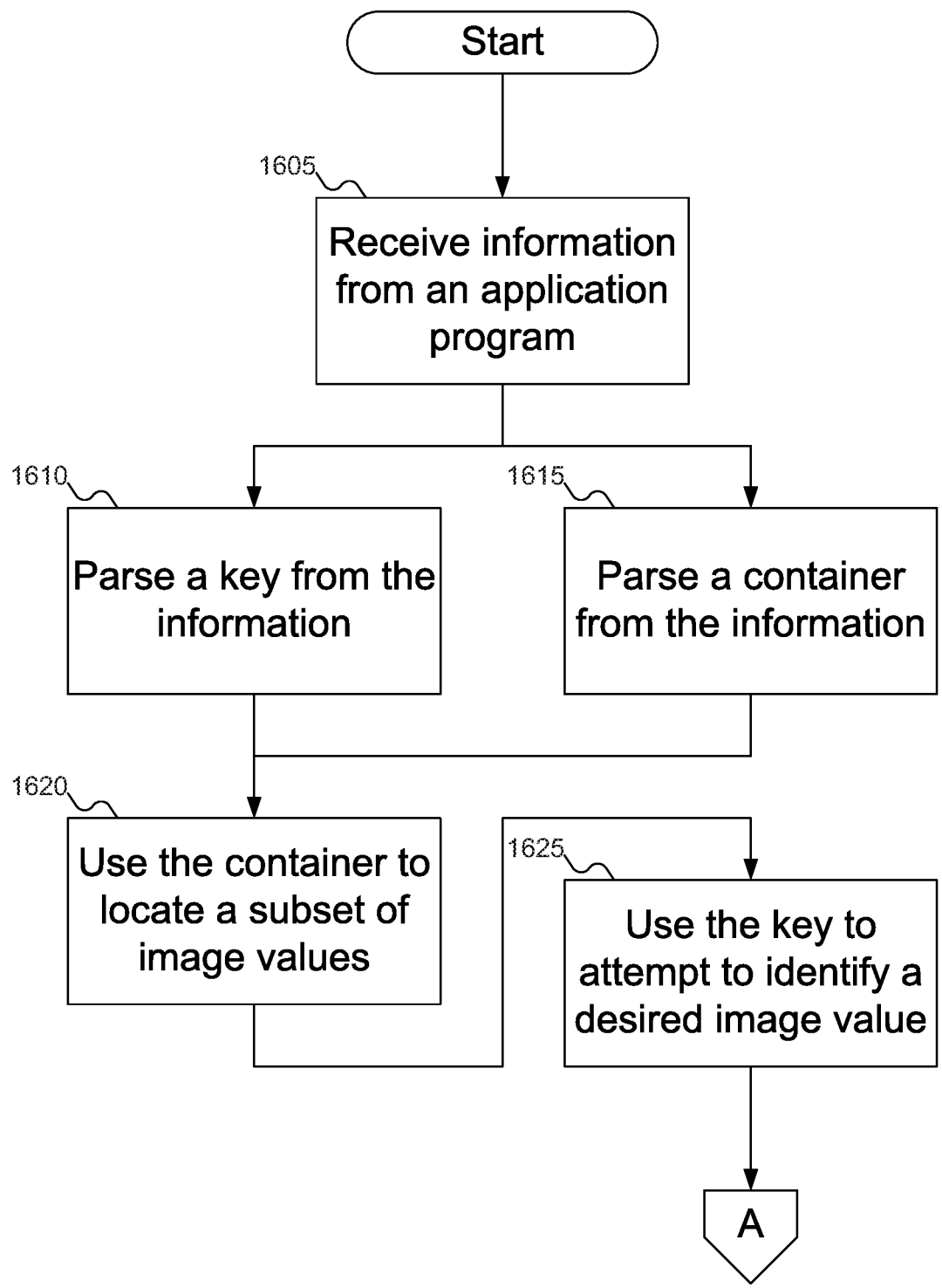
FIGS. 16A-16B show a flowchart of an example procedure for the KV-SSD of FIG. 1 to respond to a request for image data in the image object of FIGS. 6 and 10 in the KV-SSD of FIG. 1, according to an embodiment of the inventive concept.
Figure 16B:
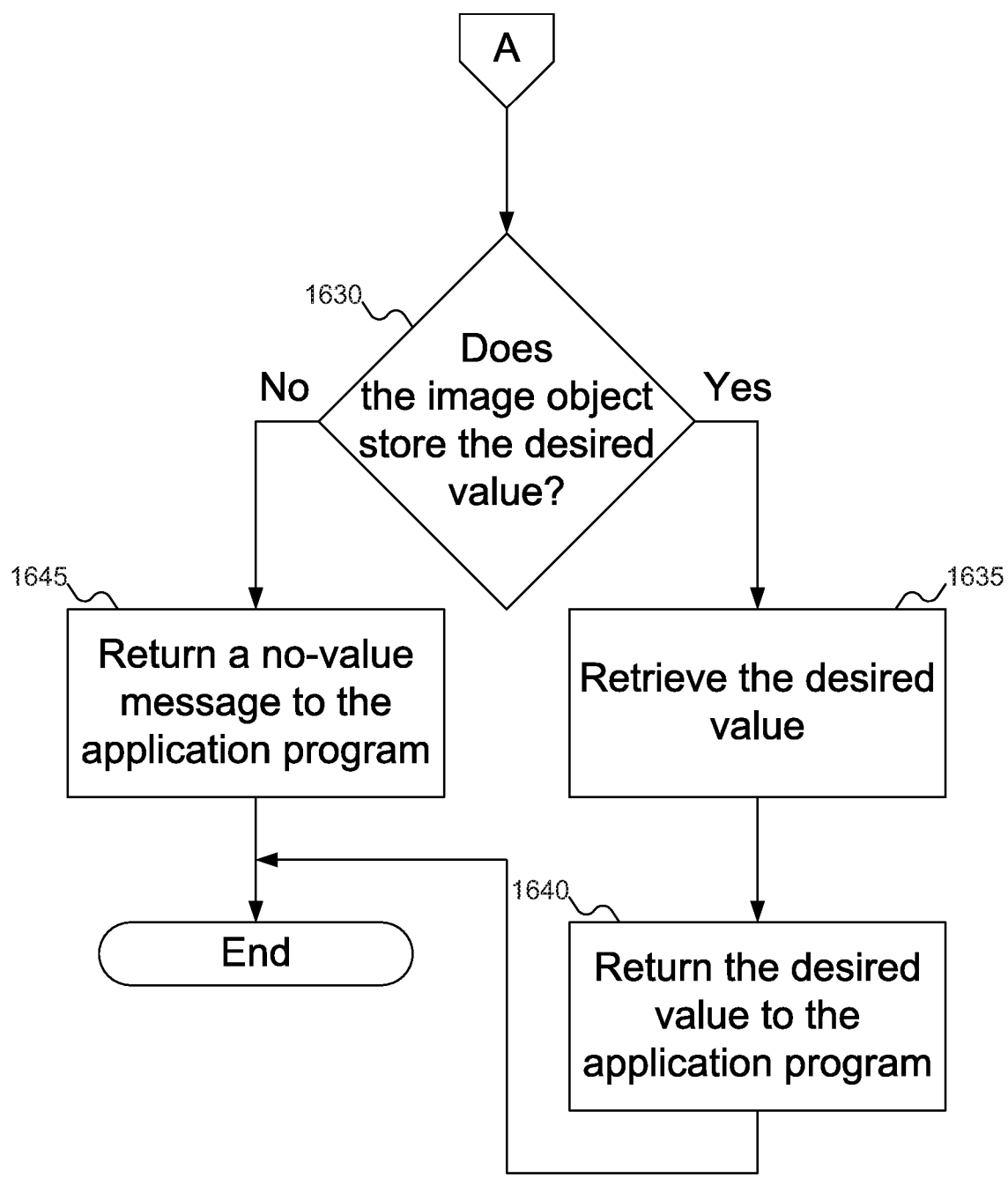

FIGS. 16A-16B show a flowchart of an example procedure for KV-SSD 120 of FIG. 1 to respond to a request for image data in image object 405 of FIGS. 6 and 9 in KV-SSD 120 of FIG. 1, according to an embodiment of the inventive concept. In FIG. 16A, at block 1605, KV-SSD 120 of FIG. 1 may receive information 810 of FIG. 8 from application program 125 of FIG. 1. At block 1610, KV-SSD 120 of FIG. 1 may parse information 810 of FIG. 8 to identify key 815 of FIG. 8 within information 810 of FIG. 8. At block 1615, KV-SSD 120 of FIG. 1 may parse information 810 of FIG. 8 to identify container 820 of FIG. 8 within information 810 of FIG. 8. Note that blocks 1610 and 1615 are not exclusive: depending on the embodiment of the inventive concept, either of blocks 1610 and 1615 may be executed or both blocks 1610 and 1615 may be executed, and in either order. At block 1620, KV-SSD 120 of FIG. 1 may use container 820 of FIG. 8 of information 810 of FIG. 8 to identify first dimension container 425-1, 425-2, or 425-3 of FIG. 6. At block 1625, KV-SSD 120 of FIG. 1 may use key 815 of FIG. 8 of information 810 of FIG. 8 to attempt to identify desired image value 410-1, 410-4, 415-1, 415-2, 415-3, 415-4, 415-5, 415-6, or 420 of FIG. 6 in the identified first dimension container.

At block 1630 (FIG. 16B), KV-SSD 120 of FIG. 1 may determine if the desired image value is found in the identified first dimension container. If yes, then at block 1635 KV-SSD 120 of FIG. 1 may retrieve the desired image value, and at block 1640 KV-SSD 120 of FIG. 1 may send the desired image value to application program 125 of FIG. 1. Otherwise, at block 1645, KV-SSD 120 of FIG. 1 may send "no-value" message 835 of FIG. 8 to application program 125 of FIG. 1, indicating that the desired image value could not be found in the identified first dimension container.

Figure 17:
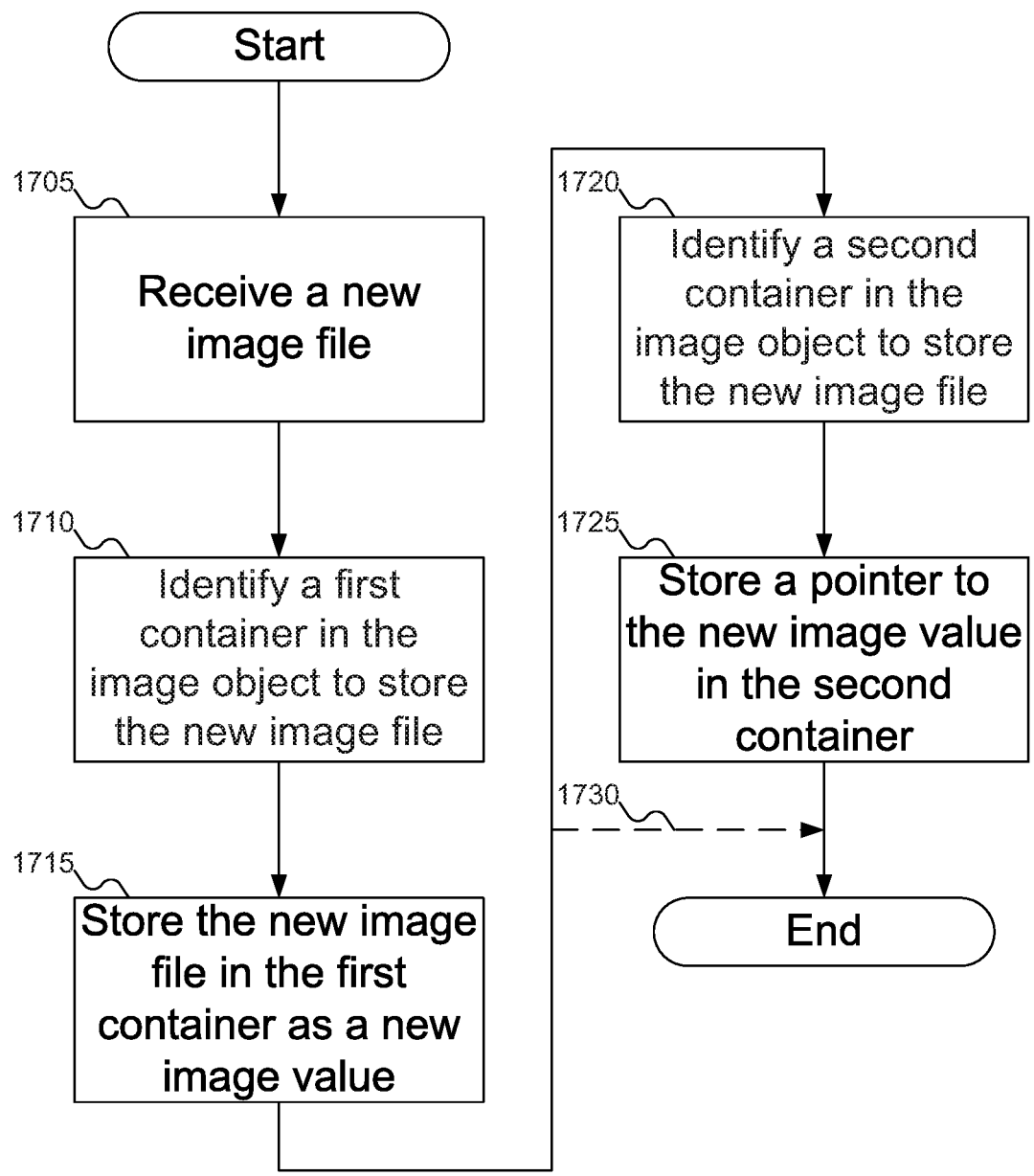
FIG. 17 shows a flowchart of an example procedure for the KV-SSD of FIG. 1 to store a new image value in the image object of FIGS. 6 and 10, according to an embodiment of the inventive concept.

FIG. 17 shows a flowchart of an example procedure for KV-SSD 120 of FIG. 1 to store a new image value in image object 405 of FIGS. 6 and 9, according to an embodiment of the inventive concept. In FIG. 17, at block 1705, KV-SSD 120 of FIG. 1 may receive a new image file from application program 125 of FIG. 1. At block 1710, KV-SSD 120 of FIG. 1 may identify first dimension container 425-1, 425-2, or 425-3 of FIG. 6, within which the new image file is to be stored as a new image value. Note that if the identified first dimension container does not exist, it may be created. For example, if the new image file was at 25% resolution and first dimension container 425-3 of FIG. 6 did not exist, first dimension container 425-3 of FIG. 6 may be created first. Then, at block 1715, KV-SSD 120 of FIG. 1 may store the new image value in the identified first dimension container.

At block 1720, KV-SSD 120 of FIG. 1 may identify second dimension container 1005 of FIG. 10, within which the new image file is also to be stored as the new image value. Note that if the identified second dimension container does not exist, it may be created. For example, if the new image file used the 4:0:0 Chroma Subsampling scheme and second dimension container 1005 of FIG. 10 did not exist, second dimension container 1005 of FIG. 10 may be created first. Then, at block 1725, KV-SSD 120 of FIG. 1 may store the new image value in the identified second dimension container. Blocks 1720 and 1725 may be skipped, as shown by dashed line 1730.

Figure 18A:
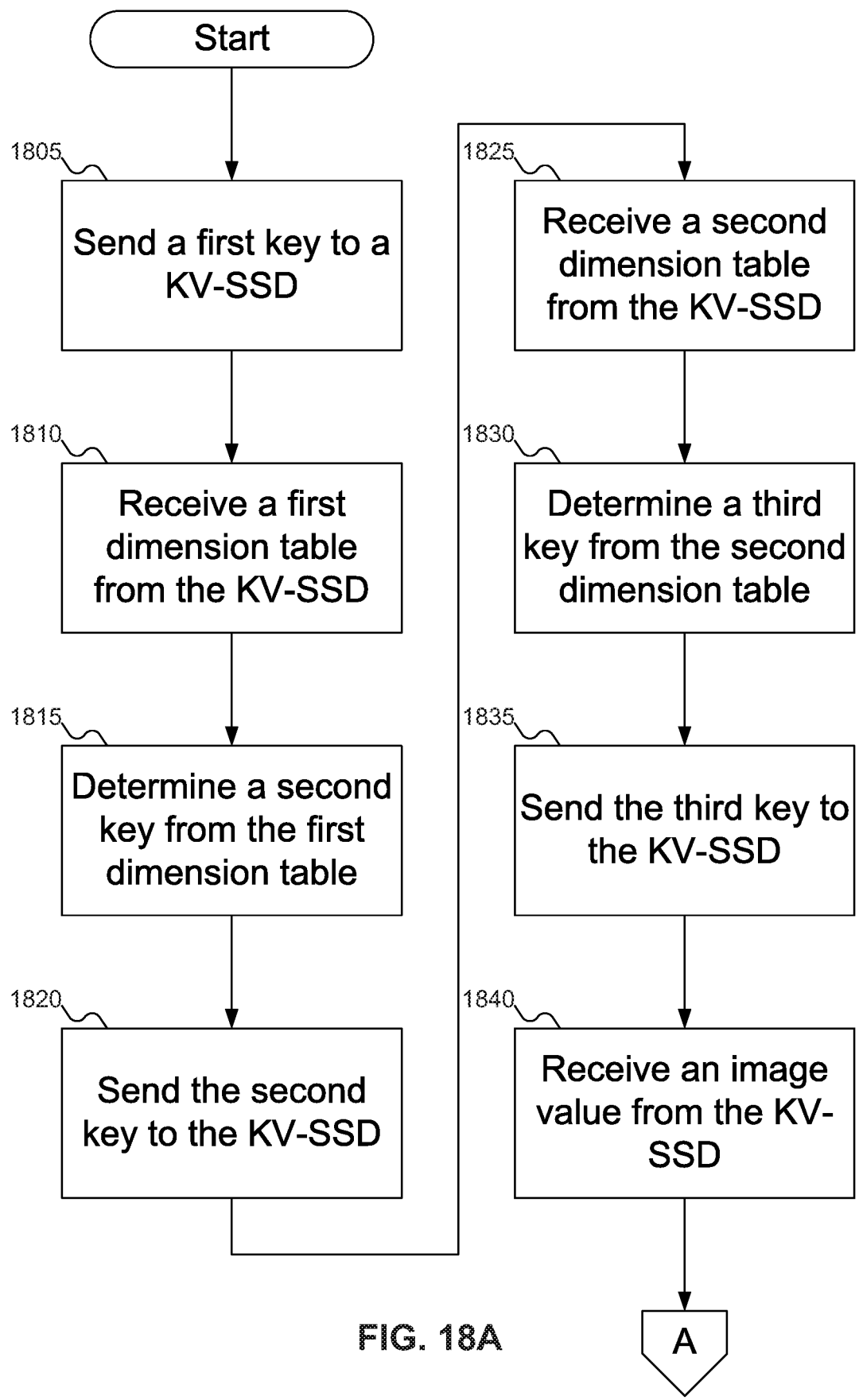
FIGS. 18A-18B show a flowchart of an example procedure for the application program of FIG. 1 to request image data in the image object of FIGS. 7 and 11 from the KV-SSD of FIG. 1, according to an embodiment of the inventive concept.
Figure 18B:
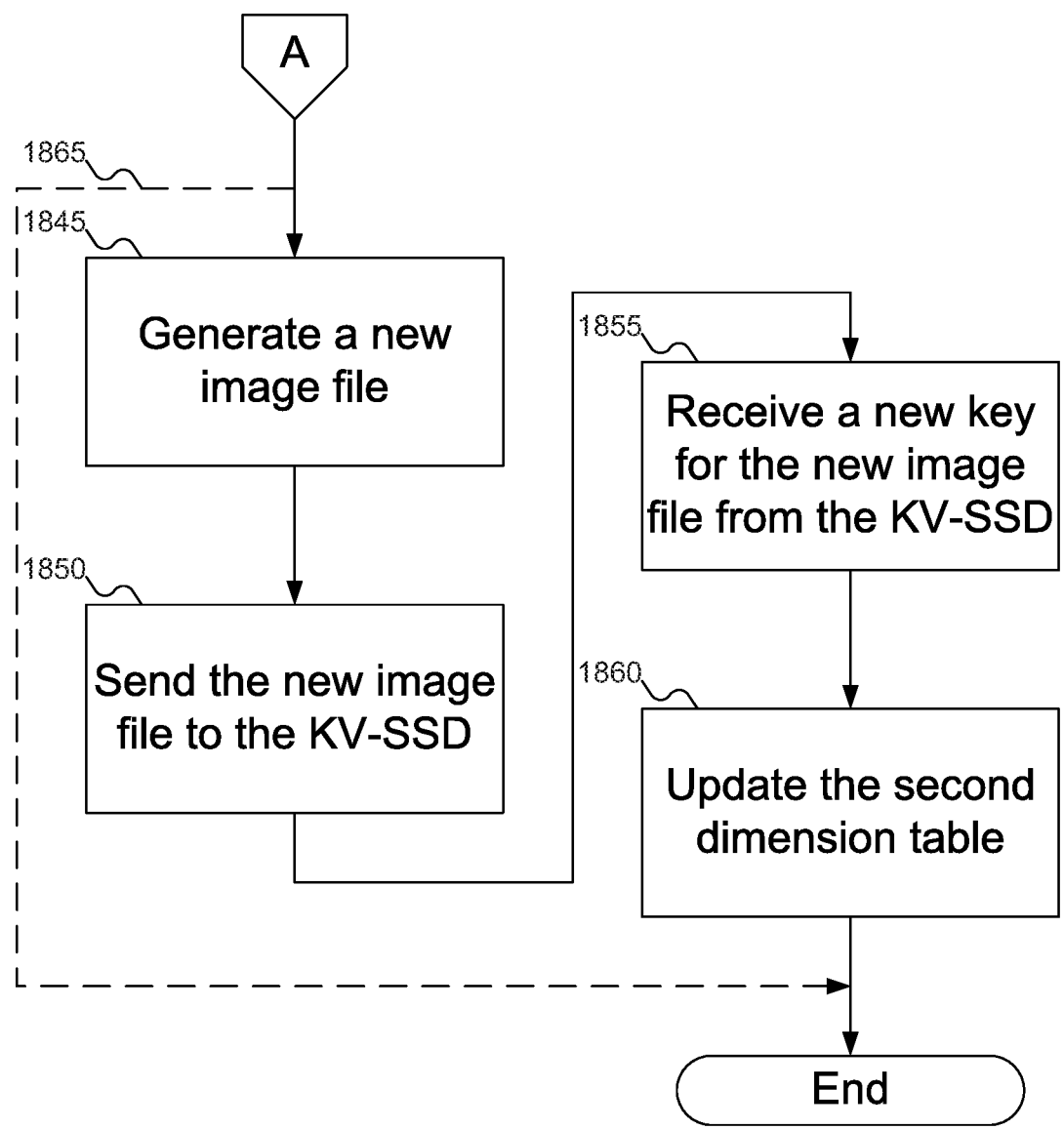

FIGS. 18A-18B show a flowchart of an example procedure for application program 125 of FIG. 1 to request image data in image object 405 of FIGS. 7 and 11 from KV-SSD 120 of FIG. 1, according to an embodiment of the inventive concept. In FIG. 18A, at block 1805, application program 125 of FIG. 1 may send a first key to KV-SSD 120 of FIG. 1. This first key may be a key for image object 405 of FIGS. 4-7 and 9-11. At block 1810, application program 125 of FIG. 1 may receive table 705 of FIG. 7, which may organize the image values according to a first dimension. At block 1815, application program 125 of FIG. 1 may determine a second key from table 705. Application program 125 of FIG. 1 may use a desired resolution or Chroma Subsampling scheme for the image value being sought, depending on the data available in table 705, to select the second key. Note that if the specific resolution or Chroma Subsampling scheme sought is not available on KV-SSD 120 of FIG. 1, application program 125 of FIG. 1 may select an alternative resolution or Chroma Subsampling scheme, and potentially use the received image value to generate a new image file at the desired resolution and Chroma Subsampling scheme.

At block 1820, application program 125 of FIG. 1 may send a second key to KV-SSD 120 of FIG. 1. At block 1825, application program 125 of FIG. 1 may receive table 710-1, 710-2, or 710-3 of FIG. 7, which may organize the image values according to a second dimension. At block 1830, application program 125 of FIG. 1 may determine a third key from the received table. Application program 125 of FIG. 1 may use a desired resolution or Chroma Subsampling scheme for the image value being sought, depending on the data available in the received table, to select the third key.

At block 1835, application program 125 of FIG. 1 may send the third key to KV-SSD 120 of FIG. 1. At block 1840, application program 125 of FIG. 1 may receive desired image value 410-1, 410-4, 415-1, 415-2, 415-3, 415-4, 415-5, 415-6, or 420 of FIG. 7 from KV-SSD 120 of FIG. 1.

At block 1845 (FIG. 18B), application program 125 of FIG. 1 may generate a new image file. At block 1850, application program 125 of FIG. 1 may send the new image file to KV-SSD 120 of FIG. 1. At block 1855, application program 125 of FIG. 1 may receive a new key for the new image value from KV-SSD 120 of FIG. 1. At block 1860, application program 125 of FIG. 1 may use the new key to update tables 705, 710-1, 710-2, and/or 710-3 of FIG. 7, to reflect the storage of the new image value. Note that in some embodiments of the inventive concept blocks 1855 and 1860 may be performed by KV-SSD 120 of FIG. 1, if KV-SSD 120 of FIG. 1 has enough information to determine which data structures on KV-SSD 120 of FIG. 1 relate to the image object of which the new image file is a new resolution/Chroma Subsampling scheme. In addition, if no new image file needs to be generated, blocks 1845-1860 may be skipped, as shown by dashed line 1865.

Figure 19:
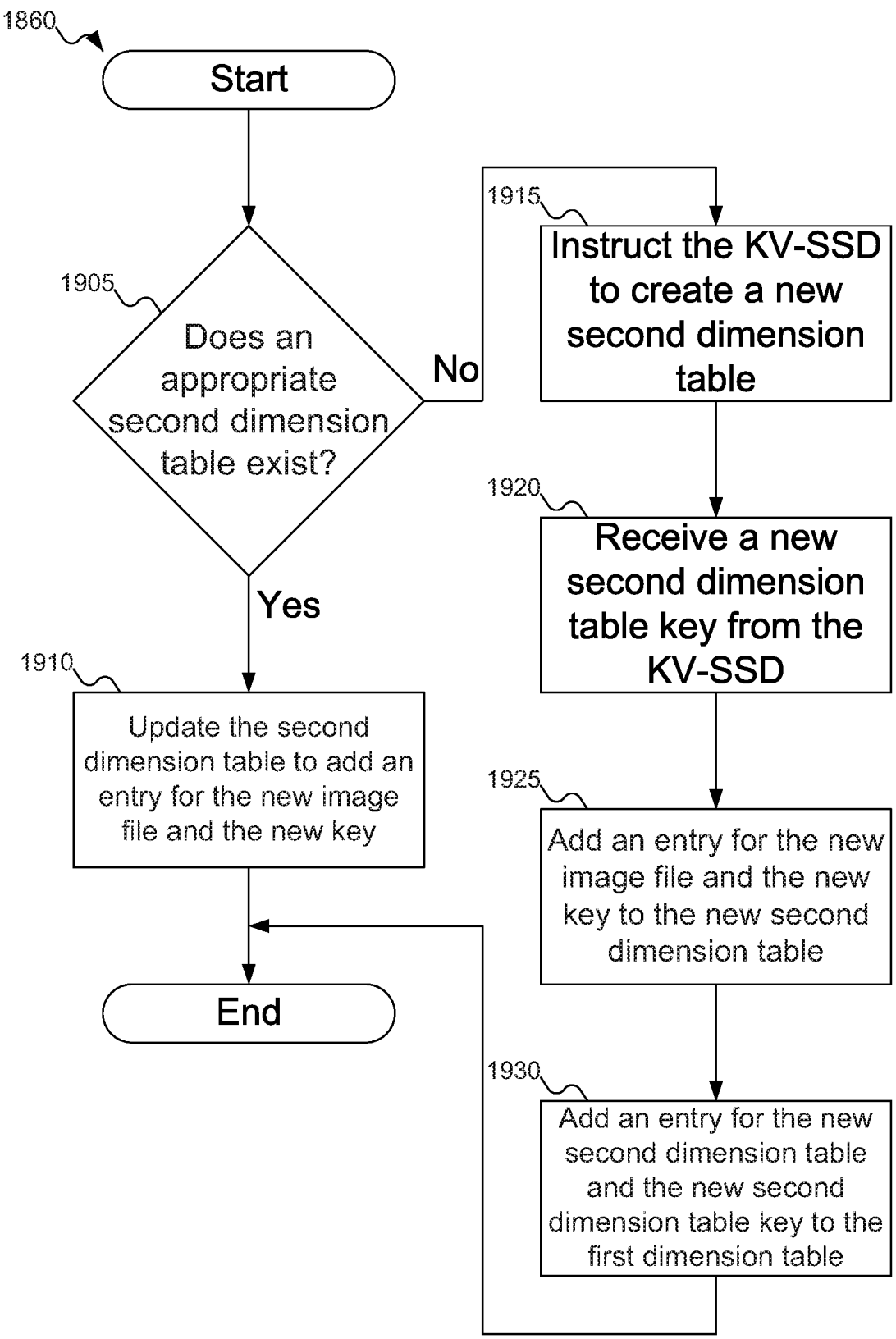
FIG. 19 shows a flowchart of an example procedure for the application program of FIG. 1 to update the data structures of FIG. 7 to store a new image value in the image object of FIGS. 7 and 11 in the KV-SSD of FIG. 1, according to an embodiment of the inventive concept.

FIG. 19 shows a flowchart of an example procedure for application program 125 of FIG. 1 to update data structures 705, 710-1, 710-2, and/or 710-3 of FIG. 7 to store a new image value in image object 405 of FIGS. 7 and 9 in KV-SSD 120 of FIG. 1, according to an embodiment of the inventive concept. In FIG. 19, at block 1905, application program 125 of FIG. 1 may determine if the appropriate second dimension table 710-1, 710-2, or 710-3 of FIG. 7 exists. If so, then at block 1910 application program 125 of FIG. 1 may add a new entry to the appropriate second dimension table to reflect the new image value/new key pair. Otherwise, at block 1915, application program 125 of FIG. 1 may instruct KV-SSD 120 of FIG. 1 to create a new second dimension table object. At block 1920, application program 125 of FIG. 1 may receive a key for the new second dimension table from KV-SSD 120 of FIG. 1. At block 1925, application program 125 of FIG. 1 may add an entry to the new second dimension table object to reflect the new image value/new key pair. Finally, at block 1930, application program 125 of FIG. 1 may update first dimension table 705 of FIG. 7 to reflect the new second dimension table/new second dimension table key pair. Note that first dimension table 705 of FIG. 7 must exist, or else KV-SSD 120 of FIG. 1 does not store image object 405 of FIG. 4 at all. Note also that in some embodiments of the inventive concept the flowchart shown in FIG. 19 may be performed by KV-SSD 120 of FIG. 1, if KV-SSD 120 of FIG. 1 has enough information to determine which data structures on KV-SSD 120 of FIG. 1 relate to the image object of which the new image file is a new resolution/Chroma Subsampling scheme.

In FIGS. 13A-19, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer several technical advantages over the prior art. First, the image object 405 of FIGS. 4-7 and 9-11 may store data for an image in any number of resolutions and/or using Chroma Subsampling schemes. By storing all the data in a single image object 405 of FIGS. 4-7 and 9-11, data is organized so that any application program may find the desired image data in image object 405 of FIGS. 4-7 and 9-11, without having to search all available storage in the hopes of finding an image file at a particular resolution using a particular Chroma Subsampling scheme. This advantage also helps save storage space, since redundant copies of the same image data do not need to be managed independently by each application program in different locations in storage.

As a corollary, as application program 125 of FIG. 1 generates new image data, the new image data may also be stored in image object 405 of FIGS. 4-7 and 9-11, permitting other application programs to find the new image data.

Third, using KV-SSD 120 of FIG. 1 to store image object 405 of FIGS. 4-7 and 9-11 also permits leveraging the power of key-value storage for image object 405 of FIGS. 4-7 and 9-11. Whereas a conventional file system stores and manages each file separately (creating the complications of image data file management that embodiments of the inventive concept are designed to solve), objects permit data to be grouped and stored as a unit, regardless of the actual structure of the data in the object. Mapping keys to storage locations on KV-SSD 120 of FIG. 1 also tends to be fast, permitting faster access to image data. And containers, which may be used to impose a structure (of sorts) on the objects stored on KV-SSD 120 of FIG. 1 permit organization of the data in image object 405 of FIGS. 4-7 and 9-11, enabling fast location of particular image data within image object 405 of FIGS. 4-7 and 9-11.

Fourth, KV-SSD 120 of FIG. 1 may receive both key 815 of FIG. 8 and container 820 of FIG. 8. KV-SSD 120 of FIG. 1 may then use container 820 of FIG. 8 to locate and return particular image data from image object 405 of FIGS. 4-7 and 9-11, rather than returning the entirety of image object 405 of FIGS. 4-7 and 9-11. This, too, expedites operation of application program 125 of FIG. 1, since application program 125 of FIG. 1 does not need to wait for all of image object 405 of FIGS. 4-7 and 9-11 to be returned from KV-SSD 120 of FIG. 1, or to extract the desired image data (and discard the rest of image object 405 of FIGS. 4-7 and 9-11).

Fifth, embodiments of the inventive concept may be combined with other inventive concepts to further enhance the overall operation of KV-SSD 120 of FIG. 1. For example, by combining embodiments of the inventive concept with a KV-SSD that supports multi-streaming, such as is disclosed in U.S. patent application Ser. No. 15/146,708, filed May 4, 2016, now U.S. Pat. No. 9,898,202, issued Feb. 20, 2018, which is a continuation-in-part of U.S. patent application Ser. No. 15/046,439, filed Feb. 17, 2016, now U.S. Pat. No. 9,880,780, issued Jan. 30, 2018, which claims the benefit of U.S. Provisional Patent Application Ser. No. 62/302,162, filed Mar. 1, 2016, all of which are incorporated by reference herein for all purposes, all requests that involve image object 405 of FIGS. 4-7 and 9-11 may be assigned to a single stream, thereby keeping all image data stored in related erase blocks on KV-SSD 120 of FIG. 1. This, in turn, may improve garbage collection performance on KV-SSD 120 of FIG. 1, since the data for image object 405 of FIGS. 4-7 and 9-11 may fill (either partly or completely) an erase block, which will be more likely filled with valid data or invalidated at about the same time. Embodiments of the inventive concept may also be combined with other concepts, such as erase block targeting mechanisms and channel targeting mechanisms, again to attempt to keep image object 405 of FIGS. 4-7 and 9-11 stored in common erase blocks so that the erase blocks are either likely filled with invalid data (and therefore may be erased without needing to program any data during garbage collection: a good choice for garbage collection) or filled with valid data (and therefore a poor choice for garbage collection).

Sixth, by using both key 815 of FIG. 8 and container 820 of FIG. 8 to identify the particular image values desired by application program 125 of FIG. 1, KV-SSD 120 of FIG. 1 may avoid returning the entirety of image object 405 of FIGS. 4-7 and 9-11. Since application program 125 of FIG. 1 likely wants image data in a particular resolution and using a particular Chroma Subsampling scheme, returning the entirety of image object 405 of FIGS. 4-7 and 9-11 requires transmitting more data than application program 125 of FIG. 1 actually wants, which takes additional time. In addition, application program 125 of FIG. 1 would then have to locate the desired data within image object 405 of FIGS. 4-7 and 9-11 (again taking time), and then discard all the undesired data from image object 405 of FIGS. 4-7 and 9-11 (using temporary storage). Modifying KV-SSD 120 of FIG. 1 to isolate the desired data from image object 405 of FIGS. 4-7 and 9-11 before transmitting anything to application program 125 of FIG. 1 saves application program 125 of FIG. 1 from having to do undesired data filtering and reduces transmission time. KV-SSD 120 of FIG. 1 may perform this data extraction from image object 405 of FIGS. 4-7 and 9-11 in any desired manner: for example, by using in-storage computing capability of KV-SSD 120 of FIG. 1 if such exists.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Key-Value Solid State Drive (KV-SSD) for storing an image object for access by an application program being executed on a machine, comprising:

a data structure stored on the KV-SSD, the data structure including a plurality of image values used by the application program and including:

a plurality of first dimension containers to organize the data according to a first dimension;

within each of the plurality of first dimension containers, a plurality of second dimension containers to organize the data according to a second dimension; and within each of the plurality of second dimension containers, at least one image value storing image data for the image object at a resolution and a Chroma Subsampling scheme.

Statement 2. An embodiment of the inventive concept includes a KV-SSD according to statement 1, wherein:

the first dimension is one of a resolution dimension and a Chroma Subsampling scheme dimension, and the second dimension is one of the resolution dimension and the Chroma Subsampling dimension.

Statement 3. An embodiment of the inventive concept includes a KV-SSD according to statement 2, wherein the data structure further comprises:

a plurality of third dimension containers to organize the data according to the second dimension;

within each of the plurality of third dimension containers, a plurality of fourth dimension containers to organize the data according to the first dimension; and within each of the plurality of fourth dimension containers, at least one pointer to the at least one image value storing the image object at the resolution and the Chroma Subsampling scheme.

Statement 4. An embodiment of the inventive concept includes a KV-SSD according to statement 1, further comprising:

a receiver to receive an information from the application program;

an object identifier to identify the data structure using a key from the information;

a data accessor to access the at least one image value in the data structure using a container in the information; and a transmitter to transmit the at least one image value to the application program.

Statement 5. An embodiment of the inventive concept includes a KV-SSD according to statement 4, wherein the transmitter is operative to transmit a no-value message to the application program if the at least one image value does not include the image data at a desired resolution and Chroma Subsampling.

Statement 6. An embodiment of the inventive concept includes a KV-SSD according to statement 1, further comprising a data extractor to extract either luma data or Chroma data from a new image value to store in the image object.

Statement 7. An embodiment of the inventive concept includes a KV-SSD according to statement 1, wherein the at least one image value stores only luma data for the image at the resolution and the Chroma Subsampling scheme.

Statement 8. An embodiment of the inventive concept includes a KV-SSD according to statement 1, wherein the at least one image value stores only Chroma data for the image at the resolution and the Chroma Subsampling scheme.

Statement 9. An embodiment of the inventive concept includes a Key-Value Solid State Drive (KV-SSD) for storing an image object for access by an application program being executed on a machine, comprising:

a data structure stored on the KV-SSD, the data structure including a plurality of image values used by the application program, the data structure including:

a plurality of first dimension containers to organize data in the image object according to a first dimension;

within each of the plurality of first dimension containers, at least one image value storing image data for the image object at a resolution and a Chroma Subsampling scheme.

Statement 10. An embodiment of the inventive concept includes a KV-SSD according to statement 9, wherein:

each of the plurality of first dimension containers includes a plurality of second dimension containers to organize the data in the image object according to a second dimension;

and each of the plurality of second dimension containers includes at least one of the at least one image value storing image data for the image object at a resolution and a Chroma Subsampling scheme.

Statement 11. An embodiment of the inventive concept includes a KV-SSD according to statement 9, wherein the first dimension is one of a resolution dimension and a Chroma Subsampling scheme dimension.

Statement 12. An embodiment of the inventive concept includes a KV-SSD according to statement 9, wherein the data structure further comprises:

a plurality of third dimension containers to organize data in the image object according to a second dimension;

within each of the plurality of third dimension containers, at least one pointer to the at least one image value storing the image object at the resolution and the Chroma Subsampling scheme, wherein the second dimension is different from the first dimension.

Statement 13. An embodiment of the inventive concept includes a KV-SSD according to statement 9, wherein each of the at least one image value is associated with a key that identifies the second dimension.

Statement 14. An embodiment of the inventive concept includes a KV-SSD according to statement 9, further comprising:

a receiver to receive an information from the application program;

an object identifier to identify the image object using a key from the information;

a data accessor to access the at least one image value in the data structure using a container in the information; and a transmitter to transmit the at least one image value to the application program.

Statement 15. An embodiment of the inventive concept includes a KV-SSD according to statement 14, wherein the transmitter is operative to transmit a no-value message to the application program if the at least one image value does not include the image data at a desired resolution and Chroma Subsampling.

Statement 16. An embodiment of the inventive concept includes a KV-SSD according to statement 9, further comprising a data extractor to extract either luma data or Chroma data from a new image value to store as a new value in the image object.

Statement 17. An embodiment of the inventive concept includes a KV-SSD according to statement 9, wherein the at least one image value stores only luma data for the image at the resolution and the Chroma Subsampling scheme.

Statement 18. An embodiment of the inventive concept includes a KV-SSD according to statement 9, wherein the at least one image value stores only Chroma data for the image at the resolution and the Chroma Subsampling scheme.

Statement 19. An embodiment of the inventive concept includes a Key-Value Solid State Drive (KV-SSD) for storing an image object for access by an application program being executed on a machine, comprising:

a first data structure stored on the KV-SSD, the first data structure storing a second key, the first data structure organizing values for the image object according to a first dimension, the first data structure associated with a first key by the KV-SSD, a second data structure stored on the KV-SSD, the second data structure storing a third key, the second data structure organizing the values for the image object according to a second dimension, the second data structure associated with the second key by the KV-SSD; and a third data structure stored on the KV-SSD, the third data structure storing an image value used by the application program, the third data structure associated with the third key by the KV-SSD, wherein the image object stores image data for an image using at least a resolution and a Chroma Subsampling scheme.

Statement 20. An embodiment of the inventive concept includes a KV-SSD according to statement 19, the KV-SSD is operative to return a plurality of first keys associated with a plurality of first data structures responsive to an object key for the image object.

Statement 21. An embodiment of the inventive concept includes a KV-SSD according to statement 19, wherein the first data structure stores a first plurality of keys including the second key, each of the first plurality of keys organizing the image data for the image object according to the first dimension.

Statement 22. An embodiment of the inventive concept includes a KV-SSD according to statement 21, wherein the second data structure stores a second plurality of keys including the third key, each of the second plurality of keys identifying a distinct image value used by the application program, the second plurality of keys organizing the image data for the image object according to both the first dimension and the second dimension.

Statement 23. An embodiment of the inventive concept includes a KV-SSD according to statement 19, wherein the first dimension is one of a resolution dimension and a Chroma Subsampling scheme dimension.

Statement 24. An embodiment of the inventive concept includes a KV-SSD according to statement 19, wherein the image object further comprises:

a fourth data structure stored on the KV-SSD, the fourth data structure storing a fifth key, the first data structure organizing the values for the image object according to the second dimension, the fourth data structure associated with a fourth key by the KV-SSD, a fifth data structure stored on the KV-SSD, the fifth data structure storing the third key, the fifth data structure organizing the values for the image object according to the first dimension, the fifth data structure associated with the fifth key by the KV-SSD.

Statement 25. An embodiment of the inventive concept includes a KV-SSD according to statement 24, the KV-SSD is operative to return a plurality of fourth keys associated with a plurality of fourth data structures responsive to an object key for the image object.

Statement 26. An embodiment of the inventive concept includes a KV-SSD according to statement 24, wherein the fourth data structure stores a third plurality of keys including the fifth key, each of the third plurality of keys organizing the image data for the image object according to the first dimension.

Statement 27. An embodiment of the inventive concept includes a KV-SSD according to statement 26, wherein the fifth data structure stores a fourth plurality of keys including the third key, each of the fourth plurality of keys identifying a distinct image value used by the application program, the fourth plurality of keys organizing the image data for the image object according to both the second dimension and the first dimension.

Statement 28. An embodiment of the inventive concept includes a KV-SSD according to statement 19, further comprising:

a receiver to receive an object key and a new image file from the application program; and a data extractor to extract either luma data or Chroma data from the new image file to store as a new image value in the image object.

Statement 29. An embodiment of the inventive concept includes a KV-SSD according to statement 19, wherein the at least one image value stores only luma data for the image at the resolution and the Chroma Subsampling scheme.

Statement 30. An embodiment of the inventive concept includes a KV-SSD according to statement 19, wherein the at least one image value stores only Chroma data for the image at the resolution and the Chroma Subsampling scheme.

Statement 31. An embodiment of the inventive concept includes a method, comprising: receiving an information from an application program at a Key-Value Solid State Drive (KV-SSD);

using a key in the information to identify an image object on the KV-SSD, the image object including at least one image value storing an image at a resolution using a Chroma Subsampling;

using a container in the information to attempt to identify a desired value of the at least one image value in the image object on the KV-SSD; and if the desired value is stored in the image object on the KV-SSD:

retrieving the desired value from the image object on the KV-SSD; and returning the desired value from the KV-SSD to the application program, wherein the image object includes at least one first dimension container to organize the at least one image value according to a first dimension and the at least one first dimension container includes at least one second dimension container to organize the at least one image value according to a second dimension, and wherein an undesired value from the image object is not returned from the KV-SSD to the application program.

Statement 32. An embodiment of the inventive concept includes a method according to statement 31, wherein, if the desired value is not stored in the image object, returning a no-value message to the application.

Statement 33. An embodiment of the inventive concept includes a method according to statement 31, wherein:

the first dimension is one of a resolution dimension and a Chroma Subsampling scheme dimension, and the second dimension is one of the resolution dimension and the Chroma Subsampling dimension.

Statement 34. An embodiment of the inventive concept includes a method according to statement 31, wherein the image object further includes at least one third dimension container to organize the at least one image value according to the second dimension and the at least one third dimension container includes at least one fourth dimension container to organize the at least one image value according to the first dimension.

Statement 35. An embodiment of the inventive concept includes a method according to statement 31, further comprising:

receiving a new image file from the application program at the KV-SSD, the new image file including image data at a generated resolution and a generated Chroma Subsampling;

identifying a target first dimension container of the at least one first dimension container in the image object on the KV-SSD according to a first dimension of the generated resolution and the generated Chroma Subsampling;

identifying a target second dimension container in the target first dimension container in the image object on the KV-SSD according to a second dimension of the generated resolution and the generated Chroma Subsampling; and storing the new image file as a new image value in the target second dimension container on the KV-SSD.

Statement 36. An embodiment of the inventive concept includes a method according to statement 35, wherein:

the method further comprises:
identifying a target third dimension container of the at least one third dimension container according to the second dimension of the generated resolution and the generated Chroma Subsampling; and
identifying a target fourth dimension container in the target third dimension container according to the first dimension of the generated resolution and the generated Chroma Subsampling; and storing the new image file as a new image value in the target second dimension container includes storing a pointer to the new image value in the target fourth dimension container.

Statement 37. An embodiment of the inventive concept includes a method according to statement 35, wherein storing the new image file as a new image value in the target second dimension container includes:

extracting luma data from the new image file;
extracting Chroma data from the new image file;
storing the luma data in a first value in the target second dimension container; and storing the Chroma data in a second value in the target second dimension container.

Statement 38. An embodiment of the inventive concept includes a method according to statement 35, identifying a target first dimension container of the at least one first dimension container in the image object on the KV-SSD according to a first dimension of the generated resolution and the generated Chroma Subsampling includes, if the target first dimension container does not exist in the image object on the KV-SSD, creating the target first dimension container in the image object on the KV-SSD.

Statement 39. An embodiment of the inventive concept includes a method according to statement 35, identifying a target second dimension container in the target first dimension container in the image object on the KV-SSD according to a second dimension of the generated resolution and the generated Chroma Subsampling includes, if the target second dimension container does not exist in the image object on the KV-SSD, creating the target second dimension container in the target first dimension container in the image object on the KV-SSD.

Statement 40. An embodiment of the inventive concept includes a method, comprising:

receiving an information from an application program at a Key-Value Solid State Drive (KV-SSD);

using a container in the information to attempt to identify a dimension container containing at least one image value storing an image at a resolution using a Chroma Subsampling in an image object on the KV-SSD, the dimension container storing a subset of data in the image object according to a first dimension;

using a key in the information to identify a desired value of the at least one image value in the image object on the KV-SSD; and if the desired value is stored in the image object on the KV-SSD:

retrieving the desired value from the image object on the KV-SSD; and returning the desired value from the KV-SSD to the application program, wherein the image object includes a plurality of dimension containers to organize the at least one image value according to the first dimension, and wherein an undesired value from the image object is not returned from the KV-SSD to the application program.

Statement 41. An embodiment of the inventive concept includes a method according to statement 40, wherein, if the desired value is not stored in the image object, returning a no-value result to the application.

Statement 42. An embodiment of the inventive concept includes a method according to statement 40, wherein:

the first dimension is one of a resolution dimension and a Chroma Subsampling scheme dimension.

Statement 43. An embodiment of the inventive concept includes a method according to statement 40, wherein the image object further includes at least one second dimension container to organize the at least one image value according to a second dimension.

Statement 44. An embodiment of the inventive concept includes a method according to statement 40, further comprising:

receiving a new image file from the application program at the KV-SSD, the new image file including new image data at a generated resolution and a generated Chroma Subsampling;

identifying a target dimension container of the at plurality of dimension containers in the image object on the KV-SSD according to the first dimension of the generated resolution and the generated Chroma Subsampling; and storing the new image file as a new image value in the target dimension container on the KV-SSD.

Statement 45. An embodiment of the inventive concept includes a method according to statement 44, wherein:

the method further comprises identifying a target second dimension container of a plurality of second dimension containers according to a second dimension of the generated resolution and the generated Chroma Subsampling; and storing the new image file as a new image value in the target second dimension container includes storing a pointer to the new image value in the target second dimension container.

Statement 46. An embodiment of the inventive concept includes a method according to statement 44, wherein storing the new image value in the target second dimension container includes:

extracting luma data from the new image value;

extracting Chroma data from the new image value;

storing the luma data in a first value in the target second dimension container; and storing the Chroma data in a second value in the target second dimension container.

Statement 47. An embodiment of the inventive concept includes a method according to statement 44, identifying a target dimension container of the at plurality of dimension containers in the image object on the KV-SSD according to the first dimension of the generated resolution and the generated Chroma Subsampling includes, if the target dimension container does not exist in the image object on the KV-SSD, creating the target dimension container in the image object on the KV-SSD.

Statement 48. An embodiment of the inventive concept includes a method, comprising: sending a first key for an image object from an application program to a KV-SSD;

receiving a first dimension table from the KV-SSD at the application program responsive to the first key;

determining a second key from the first dimension table;

sending the second key from the application program to the KV-SSD;

receiving a second dimension table from the KV-SSD at the application program responsive to the second key;

determining a third key from the second dimension table;

sending the third key from the application program to the KV-SSD; and receiving an image value from the KV-SSD at the application program responsive to the third key.

Statement 49. An embodiment of the inventive concept includes a method according to statement 48, wherein:

the first resolution table organizes the image value according to a first dimension, the first dimension one of a resolution dimension and a Chroma Subsampling scheme dimension; and the second resolution table organizes the image value according to a second dimension, the second dimension one of the resolution dimension and the Chroma Subsampling scheme dimension.

Statement 50. An embodiment of the inventive concept includes a method according to statement 48, wherein:

determining a second key from the first dimension table includes selecting the second key from the first dimension table responsive to a desired resolution; and determining a third key from the second dimension table includes selecting the third key from the second dimension table responsive to a desired Chroma Subsampling scheme.

Statement 51. An embodiment of the inventive concept includes a method according to statement 48, wherein:

determining a second key from the first dimension table includes selecting the second key from the first dimension table responsive to a desired Chroma Subsampling scheme; and determining a third key from the second dimension table includes selecting the third key from the second dimension table responsive to a desired resolution.

Statement 52. An embodiment of the inventive concept includes a method according to statement 48, further comprising generating a new image file at a desired resolution and a desired Chroma Subsampling scheme from the image value received from the KV-SSD at the application program responsive to the third key.

Statement 53. An embodiment of the inventive concept includes a method according to statement 52, further comprising:

sending the new image file from the application program to the KV-SSD;

receiving a new key at the application program from the KV-SSD; and updating the second dimension table to include an entry for the new image file at the desired resolution and the desired Chroma Subsampling scheme paired with the new key.

Statement 54. An embodiment of the inventive concept includes a method according to statement 53, wherein updating the second dimension table to include an entry for the new image file at the desired resolution and the desired Chroma Subsampling scheme paired with the new key includes:

creating a new second dimension table on the KV-SSD, the new second dimension table including the entry for the new image file at the desired resolution and the desired Chroma Subsampling scheme paired with the new key;

receiving a new second dimension table key at the application program from the KV-SSD; and updating the first dimension table to include a second entry for the new second dimension table paired with the new second dimension table key.

Statement 55. An embodiment of the inventive concept includes an article, comprising a non-transitory storage medium, the non-transitory storage medium having stored thereon instructions that, when executed by a machine, result in:

receiving an information from an application program at a Key-Value Solid State Drive (KV-SSD);

using a key in the information to identify an image object on the KV-SSD, the image object including at least one image value storing an image at a resolution using a Chroma Subsampling;

using a container in the information to attempt to identify a desired value of the at least one image value in the image object on the KV-SSD; and if the desired value is stored in the image object on the KV-SSD:

retrieving the desired value from the image object on the KV-SSD; and returning the desired value from the KV-SSD to the application program, wherein the image object includes at least one first dimension container to organize the at least one image value according to a first dimension and the at least one first dimension container includes at least one second dimension container to organize the at least one image value according to a second dimension, and wherein an undesired value from the image object is not returned from the KV-SSD to the application program.

Statement 56. An embodiment of the inventive concept includes an article according to statement 55, wherein, if the desired value is not stored in the image object, returning a no-value message to the application.

Statement 57. An embodiment of the inventive concept includes an article according to statement 55, wherein:

the first dimension is one of a resolution dimension and a Chroma Subsampling scheme dimension, and the second dimension is one of the resolution dimension and the Chroma Subsampling dimension.

Statement 58. An embodiment of the inventive concept includes an article according to statement 55, wherein the image object further includes at least one third dimension container to organize the at least one image value according to the second dimension and the at least one third dimension container includes at least one fourth dimension container to organize the at least one image value according to the first dimension.

Statement 59. An embodiment of the inventive concept includes an article according to statement 55, the non-transitory storage medium having stored thereon further instructions that, when executed by the machine, result in:

receiving a new image file from the application program at the KV-SSD, the new image file including image data at a generated resolution and a generated Chroma Subsampling;

identifying a target first dimension container of the at least one first dimension container in the image object on the KV-SSD according to a first dimension of the generated resolution and the generated Chroma Subsampling;

identifying a target second dimension container in the target first dimension container in the image object on the KV-SSD according to a second dimension of the generated resolution and the generated Chroma Subsampling; and storing the new image file as a new image value in the target second dimension container on the KV-SSD.

Statement 60. An embodiment of the inventive concept includes an article according to statement 59, wherein:

the non-transitory storage medium has stored thereon further instructions that, when executed by the machine, result in:

identifying a target third dimension container of the at least one third dimension container according to the second dimension of the generated resolution and the generated Chroma Subsampling; and identifying a target fourth dimension container in the target third dimension container according to the first dimension of the generated resolution and the generated Chroma Subsampling; and storing the new image file as a new image value in the target second dimension container includes storing a pointer to the new image value in the target fourth dimension container.

Statement 61. An embodiment of the inventive concept includes an article according to statement 59, wherein storing the new image in the target second dimension container includes:

extracting luma data from the new image file;

extracting Chroma data from the new image file;

storing the luma data in a first value in the target second dimension container; and storing the Chroma data in a second value in the target second dimension container.

Statement 62. An embodiment of the inventive concept includes an article according to statement 59, identifying a target first dimension container of the at least one first dimension container in the image object on the KV-SSD according to a first dimension of the generated resolution and the generated Chroma Subsampling includes, if the target first dimension container does not exist in the image object on the KV-SSD, creating the target first dimension container in the image object on the KV-SSD.

Statement 63. An embodiment of the inventive concept includes an article according to statement 59, identifying a target second dimension container in the target first dimension container in the image object on the KV-SSD according to a second dimension of the generated resolution and the generated Chroma Subsampling includes, if the target second dimension container does not exist in the image object on the KV-SSD, creating the target second dimension container in the target first dimension container in the image object on the KV-SSD.

Statement 64. An embodiment of the inventive concept includes an article, comprising a non-transitory storage medium, the non-transitory storage medium having stored thereon instructions that, when executed by a machine, result in:

receiving an information from an application program at a Key-Value Solid State Drive (KV-SSD);

using a container in the information to attempt to identify a dimension container containing at least one image value storing an image at a resolution using a Chroma Subsampling in an image object on the KV-SSD, the dimension container storing a subset of data in the image object according to a first dimension;

using a key in the information to identify a desired value of the at least one image value in the image object on the KV-SSD; and if the desired value is stored in the image object on the KV-SSD:

retrieving the desired value from the image object on the KV-SSD; and returning the desired value from the KV-SSD to the application program, wherein the image object includes a plurality of dimension containers to organize the at least one image value according to the first dimension, and wherein an undesired value from the image object is not returned from the KV-SSD to the application program.

Statement 65. An embodiment of the inventive concept includes an article according to statement 64, wherein, if the desired value is not stored in the image object, returning a no-value result to the application.

Statement 66. An embodiment of the inventive concept includes an article according to statement 64, wherein:

the first dimension is one of a resolution dimension and a Chroma Subsampling scheme dimension.

Statement 67. An embodiment of the inventive concept includes an article according to statement 64, wherein the image object further includes at least one second dimension container to organize the at least one image value according to a second dimension.

Statement 68. An embodiment of the inventive concept includes an article according to statement 64, the non-transitory storage medium having stored thereon further instructions that, when executed by the machine, result in:

receiving a new image file from the application program at the KV-SSD, the new image file including new image data at a generated resolution and a generated Chroma Subsampling;

identifying a target dimension container of the at plurality of dimension containers in the image object on the KV-SSD according to the first dimension of the generated resolution and the generated Chroma Subsampling; and storing the new image file as a new image value in the target dimension container on the KV-SSD.

Statement 69. An embodiment of the inventive concept includes an article according to statement 68, wherein:

the non-transitory storage medium has stored thereon further instructions that, when executed by the machine, result in identifying a target second dimension container of a plurality of second dimension containers according to a second dimension of the generated resolution and the generated Chroma Subsampling; and storing the new image file as a new image value in the target second dimension container includes storing a pointer to the new image value in the target second dimension container.

Statement 70. An embodiment of the inventive concept includes an article according to statement 68, wherein storing the new image value in the target second dimension container includes:

extracting luma data from the new image value;

extracting Chroma data from the new image value;

storing the luma data in a first value in the target second dimension container; and storing the Chroma data in a second value in the target second dimension container.

Statement 71. An embodiment of the inventive concept includes an article according to statement 68, identifying a target dimension container of the at plurality of dimension containers in the image object on the KV-SSD according to the first dimension of the generated resolution and the generated Chroma Subsampling includes, if the target dimension container does not exist in the image object on the KV-SSD, creating the target dimension container in the image object on the KV-SSD.

Statement 72. An embodiment of the inventive concept includes an article, comprising a non-transitory storage medium, the non-transitory storage medium having stored thereon instructions that, when executed by a machine, result in:

sending a first key for an image object from an application program to a KV-SSD;

receiving a first dimension table from the KV-SSD at the application program responsive to the first key;

determining a second key from the first dimension table;

sending the second key from the application program to the KV-SSD;

receiving a second dimension table from the KV-SSD at the application program responsive to the second key;

determining a third key from the second dimension table;

sending the third key from the application program to the KV-SSD; and receiving an image value from the KV-SSD at the application program responsive to the third key.

Statement 73. An embodiment of the inventive concept includes an article according to statement 72, wherein:

the first resolution table organizes the image value according to a first dimension, the first dimension one of a resolution dimension and a Chroma Subsampling scheme dimension; and the second resolution table organizes the image value according to a second dimension, the second dimension one of the resolution dimension and the Chroma Subsampling scheme dimension.

Statement 74. An embodiment of the inventive concept includes an article according to statement 72, wherein:

determining a second key from the first dimension table includes selecting the second key from the first dimension table responsive to a desired resolution; and determining a third key from the second dimension table includes selecting the third key from the first dimension table responsive to a desired Chroma Subsampling scheme.

Statement 75. An embodiment of the inventive concept includes an article according to statement 72, wherein:

determining a second key from the first dimension table includes selecting the second key from the first dimension table responsive to a desired Chroma Subsampling scheme; and determining a third key from the second dimension table includes selecting the third key from the first dimension table responsive to a desired resolution.

Statement 76. An embodiment of the inventive concept includes an article according to statement 72, the non-transitory storage medium having stored thereon further instructions that, when executed by the machine, result in generating a new image file at a desired resolution and a desired Chroma Subsampling scheme from the image value received from the KV-SSD at the application program responsive to the third key.

Statement 77. An embodiment of the inventive concept includes an article according to statement 76, the non-transitory storage medium having stored thereon further instructions that, when executed by the machine, result in:

sending the new image file from the application program to the KV-SSD;

receiving a new key at the application program from the KV-SSD; and updating the second dimension table to include an entry for the new image file at the desired resolution and the desired Chroma Subsampling scheme paired with the new key.

Statement 78. An embodiment of the inventive concept includes an article according to statement 77, wherein updating the second dimension table to include an entry for the new image file at the desired resolution and the desired Chroma Subsampling scheme paired with the new key includes:

creating a new second dimension table on the KV-SSD, the new second dimension table including the entry for the new image file at the desired resolution and the desired Chroma Subsampling scheme paired with the new key;

receiving a new second dimension table key at the application program from the KV-SSD; and updating the first dimension table to include a second entry for the new second dimension table paired with the new second dimension table key.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Key-Value Solid State Drive (KV-SSD) for storing an image object for access by an application program being executed on a machine, comprising:
    a data structure stored on the KV-SSD, the data structure including one or more image values used by the application program, the data structure including:
    one or more first dimension containers to organize data in the image object according to a first dimension;
    within the one or more first dimension containers, at least one image value storing image data for the image object at a resolution and a Chroma Subsampling scheme.

2. A KV-SSD according to claim 1, wherein the first dimension is one of a resolution dimension and a Chroma Subsampling scheme dimension.

3. A KV-SSD according to claim 1, wherein the data structure further comprises:
    one or more second dimension containers to organize data in the image object according to a second dimension;
    within the one or more second dimension containers, at least one pointer to the at least one image value storing the image object at the resolution and the Chroma Subsampling scheme,
    wherein the second dimension is different from the first dimension.

4. A KV-SSD according to claim 3, wherein the at least one image value is associated with a key that identifies the second dimension.

5. A KV-SSD according to claim 1, further comprising:
    a receiver to receive an information from the application program;
    an object identifier to identify the image object using a key from the information;
    a data accessor to access the at least one image value in the data structure using a container in the information; and
    a transmitter to transmit the at least one image value to the application program.

6. A KV-SSD according to claim 5, wherein the transmitter is operative to transmit a no-value message to the application program if the at least one image value does not include the image data at a desired resolution and Chroma Subsampling.

* * * * *